(12) United States Patent
Fukuda et al.

(10) Patent No.: US 7,638,934 B2
(45) Date of Patent: Dec. 29, 2009

(54) FLUORESCENT SUBSTANCE AND LIGHT-EMITTING DEVICE

(75) Inventors: Yumi Fukuda, Tokyo (JP); Masaaki Tamatani, Fujisawa (JP); Hironori Asai, Yokohama (JP); Naotoshi Matsuda, Chigasaki (JP); Ryosuke Hiramatsu, Kawasaki (JP); Keiko Albessard, Yokohama (JP); Jun-ichi Tatami, Yokohama (JP); Katsutoshi Komeya, Yokohama (JP); Tohru Wakihara, Yokohama (JP)

(73) Assignees: Kabushiki Kaisha Toshiba, Tokyo (JP); National University Corporation Yokohama National University, Yokohama-shi (JP)

( * ) Notice: Subject to any disclaimer, the term of this patent is extended or adjusted under 35 U.S.C. 154(b) by 615 days.

(21) Appl. No.: 11/443,095

(22) Filed: May 31, 2006

(65) Prior Publication Data
US 2006/0290269 A1 Dec. 28, 2006

(30) Foreign Application Priority Data
May 31, 2005 (JP) ............................. 2005-160512

(51) Int. Cl.
*H01J 29/06* (2006.01)
(52) U.S. Cl. ..................... 313/485; 313/512; 313/495; 313/461

(58) Field of Classification Search ......... 313/498–506, 313/461, 483–487, 495–497; 428/690
See application file for complete search history.

(56) References Cited

U.S. PATENT DOCUMENTS

2006/0011936 A1 1/2006 Hiramatsu et al.

FOREIGN PATENT DOCUMENTS

| JP | 2005-48105 | 2/2005 |
| WO | WO 2006/016711 A1 | 2/2006 |

OTHER PUBLICATIONS

U.S. Appl. No. 12/207,771, filed Sep. 10, 2008, Fukuda et al.
B.L. Abrams, et al., "Electron beam-induced degradation of zinc sulfide-based phosphors", Surface Science, vol. 451, 2000, pp. 174-181.

*Primary Examiner*—Joseph L Williams
(74) *Attorney, Agent, or Firm*—Oblon, Spivak, McClelland, Maier & Neustadt, L.L.P.

(57) ABSTRACT

A fluorescent substance is provided, with includes a matrix composed of a compound having an AlN polytypoid structure represented by the following general formula (1), and a luminescence center element:

$$(Al,M)_a(N,X)_b \qquad (1)$$

wherein M is at least one metal excluding Al, X is at least one non-metal excluding N, and a and b are positive values.

19 Claims, 12 Drawing Sheets

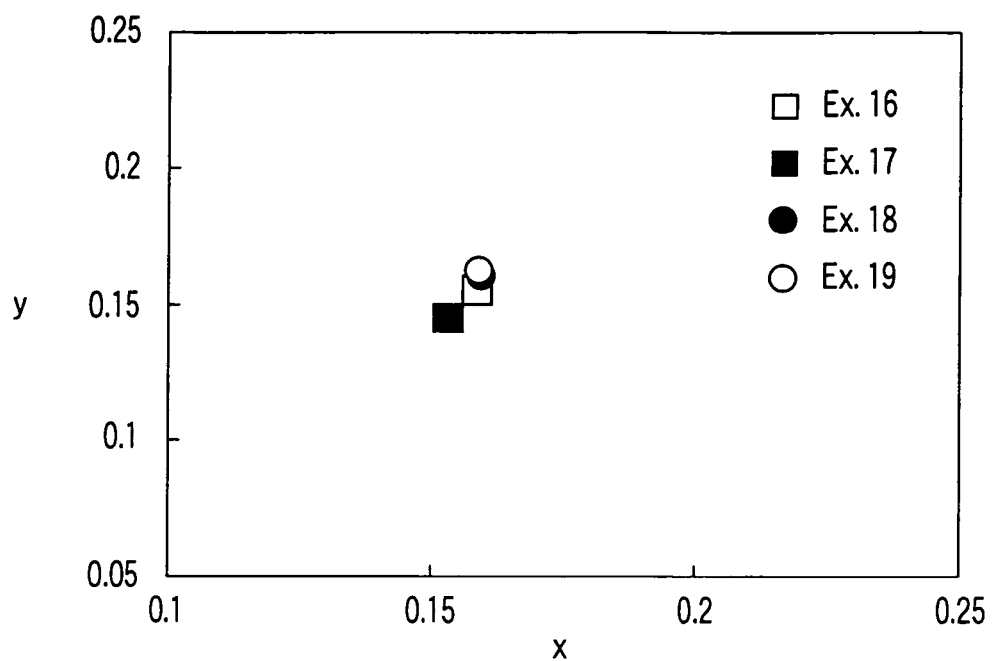
F I G. 20
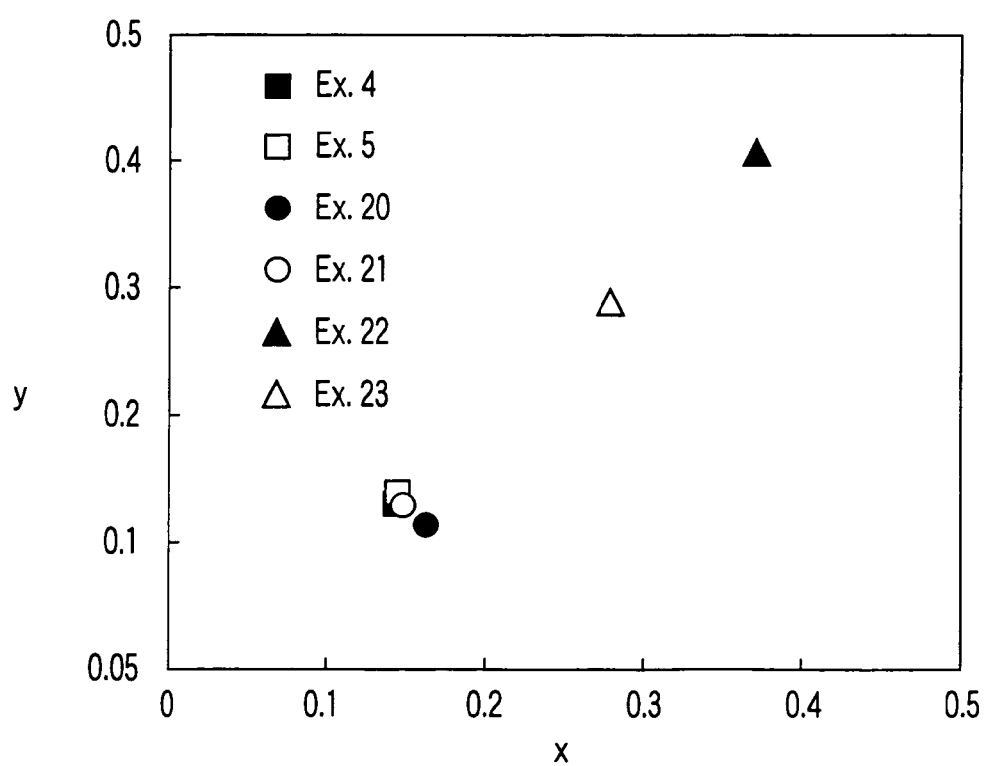
F I G. 21

FLUORESCENT SUBSTANCE AND LIGHT-EMITTING DEVICE

CROSS-REFERENCE TO RELATED APPLICATIONS

This application is based upon and claims the benefit of priority from prior Japanese Patent Application No. 2005-160512, filed May 31, 2005, the entire contents of which are incorporated herein by reference.

BACKGROUND OF THE INVENTION

1. Field of the Invention

This invention relates to a fluorescent substance to be employed in a light-emitting device and, in particular, to a fluorescent substance to be employed in a display device such as a fluorescent display tube (VFD), a PDP, a CRT, an FED, an SED and a projector, and in a light-emitting device where a blue-emitting diode or an ultraviolet-emitting diode is employed as a light source.

2. Description of the Related Art

An LED lamp utilizing a light-emitting diode is now employed in various kinds of display devices such as a portable instrument, PC peripheral equipment, OA equipment, various kinds of switches, a light source for a backlight and a display board. A high load LED is known to become hot as it is actuated, thus increasing the temperature of fluorescent substance up to about 100° C. and, due to this rise in temperature, the emission intensity of the fluorescent substance degrades. It is desirable that the fluorescent substance hardly degrade even if the fluorescent substance is caused to rise in temperature.

Incidentally, with regard to the development of a flat panel display device, although many efforts are now vigorously made on the development of a plasma display panel (PDP) and liquid crystal display (LCD), a field emission type display is expected to be more advantageous than the PDP or the LCD in the respect that it is capable of providing a clearer image.

The field emission type display is equipped with a screen where red, green and blue fluorescent substances are arrayed, and with a cathode which is disposed to face the screen at smaller intervals than those of the CRT. The cathode is provided with a plurality of electron sources as an emitter element, emitting electrons depending on a potential difference between the electron sources and the gate electrodes disposed near the electron sources. The electrons thus emitted are accelerated by an anode voltage (accelerating voltage) of the fluorescent substances side and to impinge against the fluorescent substances, thereby fluorescent substances emit light.

As for the fluorescent substances to be employed in the field emission type display constructed as described above, it is required that the fluorescent substances exhibits sufficiently high luminous efficiency, so that when the fluorescent substances are saturated with electric charge as excited by a high current density, they exhibit a sufficiently high luminous efficiency. The conventional sulfide fluorescent substances (ZnS:Cu, ZnS:Ag) which have been employed as fluorescent substances for a CRT may be a prospective candidates as meeting the aforementioned requirements. It is however reported that the sulfide fluorescent substances such as ZnS decompose under the conditions where a low energy cathode-ray display screen is excited. The decomposed matters thus generated would badly degrade a heat filament which emits an electron beam. In particular, ZnS-based blue fluorescent substances that have been conventionally employed are more vulnerable to luminance deterioration as compared with red fluorescent substances and green fluorescent substances, thereby raising the problem that the display color of a color image plane changes with time.

BRIEF SUMMARY OF THE INVENTION

A fluorescent substance according to one aspect of the present invention comprises a matrix composed of a compound having an AlN polytypoid structure represented by the following general formula (1); and a luminescence center element:

$$(Al,M)_a(N,X)_b \quad (1)$$

wherein, M is at least one metal excluding Al; X is at least one non-metal excluding N; and a and b are positive values.

A fluorescent substance according to another aspect of the present invention comprises a matrix composed of a compound having an AlN polytypoid structure represented by the following general formula (2); and a luminescence center element:

$$M'_{2/v}Al_{3n+p}Si_{10-p}N_{3n+14-p}O_p \quad (2)$$

wherein, M' is a metal selected from the group consisting of alkaline earth metals and rare earth metals; v is an ionic valency of the metal M'; and p and n are values satisfying conditions of $0<p<10$, $1\leq n$, respectively.

A light-emitting device according to a one aspect of the present invention comprises an energy source configured to emit electrons; and a layer comprising a fluorescent substance configured to be impinged by the electrons, at least part of the fluorescent substance being formed of a luminescence center element and a matrix composed of a compound having an AlN polytypoid structure represented by the following general formula (1) or (2):

$$(Al,M)_a(N,X)_b \quad (1)$$

wherein, M is at least one metal excluding Al; X is at least one non-metal excluding N; and a and b are positive values;

$$M'_{2/v}Al_{3n+p}Si_{10-p}N_{3n+14-p}O_p \quad (2)$$

wherein, M' is a metal selected from the group consisting of alkaline earth metals and rare earth metals; v is the ionic valency of the metal M'; and p and n are values satisfying conditions of $0<p<10$, $1\leq n$, respectively.

A light-emitting device according to another aspect of the present invention comprises a light-emitting element configured to emit a light having a wavelength of 250 nm to 500 nm; and a layer comprising a fluorescent substance formed on the light-emitting element, at least part of the fluorescent substance being formed of a luminescence center element and a matrix composed of a compound having an AlN polytypoid structure represented by the following general formula (1) or (2):

$$(Al,M)_a(N,X)_b \quad (1)$$

wherein, M is at least one metal excluding Al; X is at least one non-metal excluding N; and a and b are positive values;

$$M'_{2/v}Al_{3n+p}Si_{10-p}N_{3n+14-p}O_p \quad (2)$$

wherein, M' is a metal selected from the group consisting of alkaline earth metals and rare earth metals; v is the ionic valency of the metal M'; and p and n are values satisfying conditions of $0<p<10$, $1\leq n$, respectively.

BRIEF DESCRIPTION OF THE SEVERAL VIEWS OF THE DRAWING

FIG. 20 is a graph showing the chromaticity in a 2°-visual field in the excitation of the fluorescent substances of Examples 16 to 19 by electron beam; and FIG. 21 is a graph showing the chromaticity in a 2°-visual field in the excitation of the fluorescent substances of Examples 4, 5, 20 to 23 by electron beam.

DETAILED DESCRIPTION OF THE INVENTION

Figure 1:
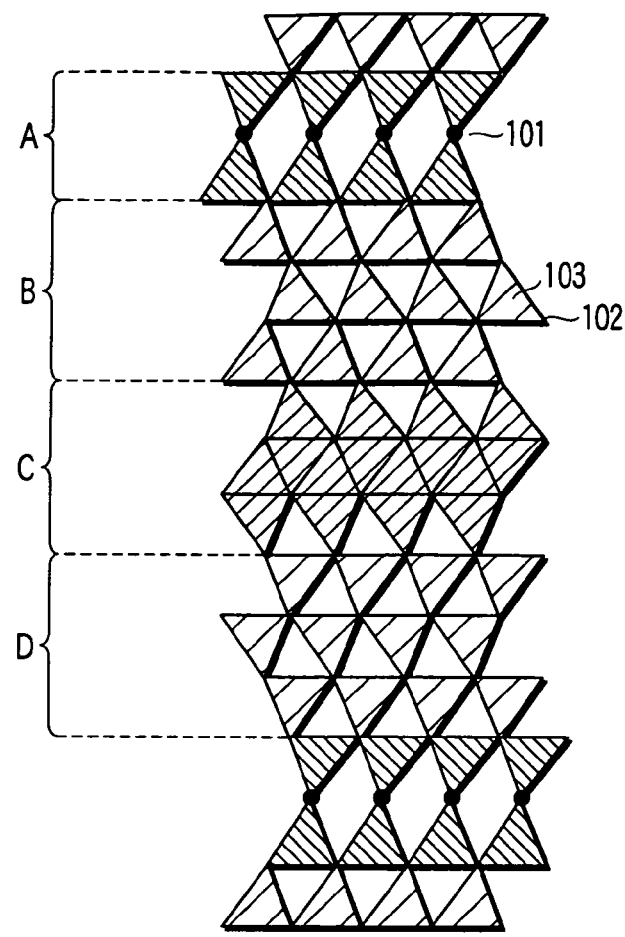
FIG. 1 is diagram schematically illustrating the structure of a fluorescent substance according to one embodiment of the present invention.

Next, embodiments of the present invention will be explained.

It has been found out by the present inventors that it is possible to obtain a fluorescent substance useful for white LED and excellent in temperature characteristic and also to obtain an electron beam-excitable fluorescent substance having a long life through the addition of a luminescence center element to a non-oxide type compound having an AlN polytypoid (pseudo-polytype) structure, especially an AlN polytypoid sialon-based compound. The term "non-oxide type" compound employed herein is meant to include every kinds of compounds except pure oxides and hence includes oxynitrides, oxycarbides, etc. The present invention has been accomplished based on these findings.

The AlN polytypoid is a group of compounds having a laminar structure of long period comprising, as a fundamental lattice, a wurtzite type AlN having a structure represented by the following general formula (1).

$$(Al,M)_a(N,X)_b \quad (1)$$

(In the general formula (1), M is at least one metal excluding Al; X is at least one non-metal excluding N; and a and b are positive values).

The values of a and b in the aforementioned general formula (1) are determined by a mixing ratio of materials for example and can be confirmed by chemical analysis, etc.

This AlN polytypoid is formed of a structure which is unique in that when the Al of AlN is replaced by a metal M other than Al and the N of AlN is replaced by a non-metal X other than N, the period of lamination in the direction of c-axis fluctuates depending on the magnitude of substitution of these elements. As for M, it is possible to employ Si, Ge, alkaline earth metals, rare earth metals, etc. As for X, it is possible to employ oxygen, carbon, etc. As for the alkaline earth metals, it is possible to employ, for example, Ba, Ca, Sr and Mg. These elements can be employed singly or in combination of two or more. Further, as for rare earth metals, it is possible to employ, for example, Y, Gd and La. These elements can be employed singly or in combination of two or more. The alkaline earth metals and the rare earth metals can be also combined with each other.

For example, in the case of polytypoid sialon where Si is introduced therein as M and O is introduced therein as X, various polymorphisms are conceivable such as $2H^\delta(AlN)$, $8H(3AlN.SiO_2)$, $15R(4AlN.SiO_2)$, $12H(5AlN.SiO_2)$, $21R(6AlN.SiO_2)$, $27R(8AlN.SiO_2)$, $33R(10AlN.SiO_2)$, $24H(11AlN.SiO_2)$ and $39R(12AlN.SiO_2)$. The fluorescent substance according to one embodiment of the present invention is composed of, as a matrix, the same structure as this AlN polytypoid, and a luminescence center element. This luminescence center element exists as a substituent substituting for any one of the elements in the matrix or as a solid solution together with any one of the elements in the matrix.

The content of the luminescence center element in the fluorescent substance should preferably be confined within the range of 0.1 to 40 mol % based on a total quantity of Al and M. If the content of the luminescence center element is less than 0.1 mol %, it would become difficult to obtain a sufficient emission effect. On the other hand, if the content of the luminescence center element exceeds 40 mol %, concentration quenching may occur.

Alternatively, the matrix in the fluorescent substance according to one embodiment of the present invention may be represented by the following general formula (2).

$$M'_{2/v}Al_{3n+p}Si_{10-p}N_{3n+14-p}O_p \quad (2)$$

(In the general formula (2), M' is a metal selected from the group consisting of alkaline earth metals and rare earth metals; v is the ionic valency of the metal M'; and p and n are values satisfying conditions of 0<p<10, 1≦n, respectively).

The values of p and n in the general formula (2) are determined by a high-resolution electron microscope (HREM), electron beam diffraction (EDS), etc. The n is a value related to the period of polytypoid lamination. Since there is no upper limit in the period of lamination, there is no upper limit in the value of n.

Specific example of the matrix includes a sialon-based compound represented by the following general formula (4). Incidentally as for the kinds of the alkaline earth metal and the rare earth metal to be introduced into M', it is possible to employ those that have been listed as employable in the aforementioned general formula (1).

$$M'Si_{10-p}Al_{18+p}N_{32-p}O_p \quad (4)$$

(In the general formula (4), M' is a metal selected from the group consisting of alkaline earth metals and rare earth metals; and p is a value satisfying a condition of 0<p<10).

This general formula (4) represents one example of the aforementioned general formula (2) wherein v is limited to 2 and n is limited to 6.

The fluorescent substance according to one embodiment of the present invention may be defined, for example, such that at least part of the metal M' in the aforementioned general formula (4) is replaced by the luminescence center element. This fluorescent substance can be represented by the following general formula (3):

$$(M'_{1-q}Q_q)Si_{10-p}Al_{18+p}N_{32-p}O_p \quad (3)$$

(In the general formula (3), M' is a metal selected from the group consisting of alkaline earth metals and rare earth metals; Q is a luminescence center element; and p and q are values satisfying conditions of 0<p<10, 1≦n, respectively).

In this case, it is preferable that at least 0.1 mol % of the metal M' is replaced by a luminescence center element. If the quantity of substitution is less than 0.1 mol %, it would become difficult to obtain a sufficient emission efficiency. Alternatively, 100% of the alkaline earth metal M' may be replaced by a luminescence center element. In the latter case, it is more advantageous in that the emission efficiency can be further enhanced.

As for examples of the luminescence center element to be included in the fluorescent substance according to one embodiment of the present invention, they include Eu, Ce, Mn, Tb, Yb, Dy, Sm, Tm, Pr, Nd, Pm, Ho, Er, Gd, Cr, Sn, Cu, Zn, Ga, Ge, As, Ag, Cd, In, Sb, Au, Hg, Tl, Pb, Bi and Fe. In view of the variability of emission wavelength, etc., it is more preferable to employ at least one selected from Eu and Mn.

Incidentally, the non-oxide compound having an AlN polytypoid structure should preferably contain 0.3 to 30% by weight of oxygen. Since oxides turn into a liquid phase at high temperatures, the synthesis of the compound can be promoted through a liquid phase of oxides. If the content of oxygen is less than 0.3% by weight, the reactivity of oxide may be degraded, thereby making it difficult to perform excellent synthesis. On the other hand, if the content of oxygen exceeds as much as 30% by weight, it may become no longer possible to obtain a polytypoid structure.

FIG. 1 schematically illustrates the structure of the fluorescent substance represented by the aforementioned general formula (3) (J. Grins, S. Esmaeilzadeh, G. Svensson, Z. J. Shen, J. Euro. Cera. Soc. 19, 2723 (1999)). In FIG. 1, each triangle represents a regular tetrahedron structure comprising Al or Si as an element 103 at the center of gravity, and N or O as an element 102 at each apex thereof. A reference numeral 101 in FIG. 1 denotes alkaline earth metal M'. As shown in FIG. 1, the fluorescent substance represented by the aforementioned general formula (3) is constituted by a four-ply layer consisting of a layer indicated by "A" having 12 coordinations with M' being positioned at the center; a layer indicated by "B" composed of regular tetrahedrons with apexes thereof being shared with each other; a layer indicated by "C" composed of regular tetrahedrons with planes thereof being shared with each other; and a layer indicated by "D" composed of regular tetrahedrons with apexes thereof being shared with each other. With respect to a total number of regular tetrahedron structures to be included in each layer of "A", "B", "C" and "D", it may not be limited to that of example shown in FIG. 1 but may be optionally altered. Namely, the fluorescent substance is constructed to comprise wurtzite structures each consisting of AlN$_4$ regular tetrahedron structures with apexes thereof being shared with each other, in which an SiN$_4$ structure and a tetradecahedron structure having M' positioned at the center thereof are periodically (intermittently) sandwiched, as a lamina at the site 101, between the wurtzite structures. Due to this structure, the fluorescent substance according to one embodiment of the present invention is provided with excellent properties as explained hereinafter in detail.

The fluorescent substance according to one embodiment of the present invention can be obtained by a process wherein SrCO$_3$, AlN, Si$_3$N$_4$ and Eu$_2$O$_3$ all employed as starting materials for example are weighed and mixed together to obtain a mixed powder having a stoichiometric composition, which is then sintered. More specifically, for example, SrCO$_3$, AlN, Si$_3$N$_4$ and Eu$_2$O$_3$ are respectively weighed to obtain a predetermined mixing ratio, then mixed together in dehydrated isopropanol (IPA) and pulverized in a ball mill for 2 to 72 hours. It is also possible to employ, other than the aforementioned IPA, other organic solvent such as ethanol or an aqueous solution. The mixing of these starting materials may be performed by either dry mixing or wet mixing in a mortar.

After IPA has been volatilized and removed by room temperature drying, the mixture is allowed to dry overnight in air atmosphere and at a temperature ranging from 0 to 40° C. The resultant mixture is cracked in a mortar and then charged in a molybdenum crucible. The drying of the mixture may be performed using a hot plate as desired. Further, as for the material of the crucible, it may be carbon, boron nitride, silicon nitride, silicon carbide, aluminum nitride, sialon or tungsten.

The mixture in the crucible is then subjected to sintering for a predetermined period to obtain a fluorescent substance having a predetermined composition. The pressure in the sintering step should preferably be higher than atmospheric pressure, more preferably 5 atm. or more in order to suppress the decomposition of silicon nitride at high temperatures. The sintering temperature should preferably be confined within the range of 1500 to 2000° C., more preferably the range of 1800 to 2000° C. If the sintering temperature is lower than 1500° C., it may become difficult to create a polytypoid structure. On the other hand, if the sintering temperature is higher than 2000° C., the materials or products may sublime. Further, since AlN employed as a raw material is vulnerable to oxidation, the sintering should preferably be performed in a $N_2$ gas atmosphere or in a mixed gas atmosphere consisting of nitrogen gas and hydrogen gas.

Generally, as the temperature of fluorescent substance is raised, the emission efficiency degrades (temperature quenching). However, the fluorescent substance according to one embodiment of the present invention is featured in that it is minimal in deterioration of emission efficiency even if the temperature of fluorescent substance is raised, thus indicating enhancement of quenching temperature. As for the factors which may have influence on the temperature quenching, they include a difference in size between the ion of luminescence center and the ion of fluorescent substance matrix to be replaced by the ion of the luminescence center, and the stability of crystal lattice of the fluorescent substance matrix. It is assumed that, due to the crystal structure described above, the fluorescent substance having an AlN polytypoid structure according to one embodiment of the present invention is high in quenching temperature.

The fluorescent substance according to one embodiment of the present invention is constructed to have a regular tetrahedron structure as shown in FIG. 1. The triangle shown in FIG. 1 is featured that it comprises Al or Si as an element 103 at the center of gravity, and N or O as an element 102 at each apex thereof. The followings are analyses made by the present inventors on this regular tetrahedron structure. Namely, in the nitride fluorescent substance having, as a fundamental skeleton, an $AlN_4$ or $SiN_4$ regular tetrahedron structure, the crystal lattice becomes more rigid and stable as the number of shared apexes in the regular tetrahedron is increased. In the case of the fluorescent substance according to the embodiment of the present invention, the number of shared apexes is 2 to 6, wherein the locations where two apexes are shared are four, the locations where four apexes are shared are about 60, and the locations where six apexes are shared are about 24. Whereas, in the case of $Ca_2Si_5N_8$:Eu whose fundamental skeleton is also formed of $SiN_4$ regular tetrahedron structure and conventionally known as a blue exciting red fluorescent substance, an average number of shared apexes is 2 to 3. Since the number of shared apexes is larger than the conventional fluorescent substance, the fluorescent substance according to the embodiment of the present invention is considered as being more stable in crystal lattice. The facts that the luminescence center is located in the two-dimensional laminar structure and that the fluorescent substance is formed of a tetradecahedron coordination structure also contribute to the enhancement of stability of structure around the luminescence center. Due to these structural characteristics, it is considered possible to enhance the quenching temperature of the fluorescent substance according to one embodiment of the present invention.

The powder that has been sintered is optionally subjected to post treatments such as washing to obtain a fluorescent substance according to one embodiment of the present invention. The washing can be performed by washing with pure water or by acid washing for example. Incidentally, as for the conventional nitride fluorescent substance, there is also known $CaAlSiN_3$:Eu, which can be synthesized by using $Ca_3N_2$, etc., as raw materials. Since this raw material is anaerobic, the weighing and mixing of raw material on the occasion of the synthesis of fluorescent substance are required to be performed in an environment which is sealed off from air atmosphere, e.g., in a globe box. Whereas, in the case of synthesizing a fluorescent substance according to one embodiment of the present invention however, the weighing and mixing of raw materials can be performed in air atmosphere. The reason for this can be ascribed to the fact that the reactivity in air atmosphere of the raw materials of fluorescent substance according to one aspect of the present invention is lower than that of the aforementioned $Ca_3N_2$. Therefore, the fluorescent substance according to one embodiment of the present invention can be manufactured in a very simple process, thereby making it possible to remarkably reduce the manufacturing cost.

Figure 2:
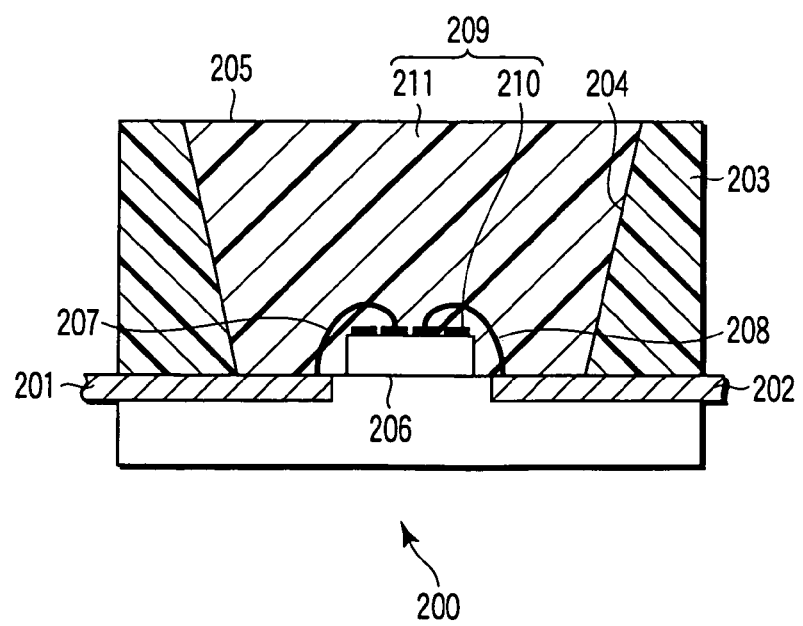
FIG. 2 is a cross-sectional view schematically illustrating the structure of a light-emitting device according to one embodiment of the present invention.

FIG. 2 shows a cross-sectional view of the light-emitting device according to another embodiment of the present invention.

In the light-emitting device shown in FIG. 2, a resinous stem 200 comprises a lead 201 and a lead 202 both formed from a lead frame, and a resin portion 203 which is formed integral with these leads 201 and 202. This resin portion 203 is provided with a recess 205 having an expanded upper opening and a contracted bottom and with a reflection surface 204 on the sidewall of recess 205.

A light-emitting chip 206 is mounted at a central portion of nearly circular bottom of the recess 205 by using a Ag paste. As for the light-emitting chip 206, it is possible to employ, for example, a light-emitting diode, a laser diode, etc. Alternatively, it is also possible to employ those which are capable of emitting ultraviolet rays. Namely, there is not any particular limitation with respect to the kinds of the light-emitting chip 206. Thus, it is possible to employ, other than the ultraviolet ray-emitting chip, a chip which is capable of emitting a blue light, a bluish purple light, near-ultraviolet ray. For example, it is possible to employ a semiconductor light-emitting element such as GaN, etc. The electrodes (not shown) of the light-emitting chip 206 are electrically connected, through bonding wires 207 and 208 made of Au, etc., with the lead 201 and the lead 202, respectively. Incidentally, the arrangement of these leads 201 and 202 can be optionally modified.

A fluorescent layer 209 is placed in the recess 205 of resin portion 203. This fluorescent layer 209 can be formed by dispersing or sedimenting a fluorescent substance 210 according to one embodiment of the present invention in a resin layer 211 made of silicone resin for example at a ratio ranging from 5 to 50% by weight. Due to the specific structure, the fluorescent substance according to one embodiment of the present invention has a plate-like crystal configuration. Because of this, when a resin having a very low viscosity is employed on the occasion of sedimenting the fluorescent substance according to one embodiment of the present invention onto the light-emitting chip, the fluorescent substance falls down, through the resin, onto the light-emitting chip and then to stably settle on the light-emitting chip with the shorter axis of fluorescent substance being orientated perpendicular to the surface of light-emitting chip. Therefore, since the shorter axis of most of crystal grains tends to become perpendicular to the surface of light-emitting chip, the fluorescent substance can be mounted with the crystal orientation thereof being uniformly arranged. As a result, it is now possible to effectively suppress the generation of non-uniformity in emission characteristics among the individual light-emitting chips that may be caused due to the non-uniformity in crystal orientation of fluorescent substance. Further, since a nitride which is high in covalent property is employed as a matrix in the case of the fluorescent substance according to one embodiment of the present invention, the fluorescent substance is made hydrophobic and hence very excellent in affinity with the resin. Therefore, it is possible to effectively suppress the scattering of light at the resin/fluorescent substance interface, thus enhancing the light-extracting efficiency.

As for the light-emitting chip 206, it is possible to employ a flip-chip type chip where an n-type electrode and a p-type electrode are positioned on the same plane. In this case, it is possible to overcome the problems originating from wire such as the cut-off or peeling of wire and the absorption of light by the wire, thus making it possible to obtain a semiconductor light-emitting device which is high in reliability and also high in luminance. Further, it is also possible to employ an n-type substrate for the light-emitting chip 206 to fabricate the following structure. More specifically, an n-type electrode is formed on the bottom surface of an n-type substrate, a p-type electrode is formed on the upper surface of a semiconductor layer formed on the substrate, and the n-type electrode or the p-type electrode is mounted on one of leads. The rest of the p-type electrode and the n-type electrode is electrically connected through a wire with the other lead. The size of the light-emitting chip 206, the dimension and configuration of the recess 205 may be optionally modified.

The fluorescent substance according to one embodiment of the present invention exhibits an emission peak at a specific region of wavelength, which can be changed depending on the kind of luminescence center element contained in the fluorescent substance. For example, when only Eu is contained as a luminescence center element, an emission peak will be exhibited at a region of wavelength ranging from 450 nm to 500 nm as the fluorescent substance is excited by a light having a wavelength ranging from 250 nm to 500 nm. The half band width of these emission peaks is relatively small, i.e. less than 65 nm. Further, when only Mn or both Mn and Eu are contained as a luminescence center element, an emission peak will be exhibited at a region of wavelength ranging from 450 nm to 500 nm and at a region of wavelength ranging from 550 nm to 650 nm as the fluorescent substance is excited by a light having a wavelength ranging from 250 nm to 500 nm. Therefore, when a light-emitting diode exhibiting a wavelength region ranging from 360 nm to 500 nm is combined with a fluorescent substance according to one embodiment of the present invention in such a manner that the light-emitting diode is covered with the fluorescent substance, it is possible to obtain a light-emitting device which is capable of exhibiting various kinds of luminous colors.

The fluorescent substance according to one embodiment of the present invention can be employed so as to obtain a light-emitting device which can be excited by an electron energy. For example, when Eu and/or Mn is included as a luminescence center element in a fluorescent substance, it is possible to obtain an emission peak at the same wavelength region as in the case of the aforementioned photo excitation.

The fluorescent substance according to one embodiment of the present invention can be applied to the fabrication of a projection type display of CRT system. In this display, a red monochrome CRT (projector tube), a green monochrome CRT and a blue monochrome CRT are employed and the images from these projector tubes are projected, through a lens system and as enlarged images, on a screen.

Figure 3:
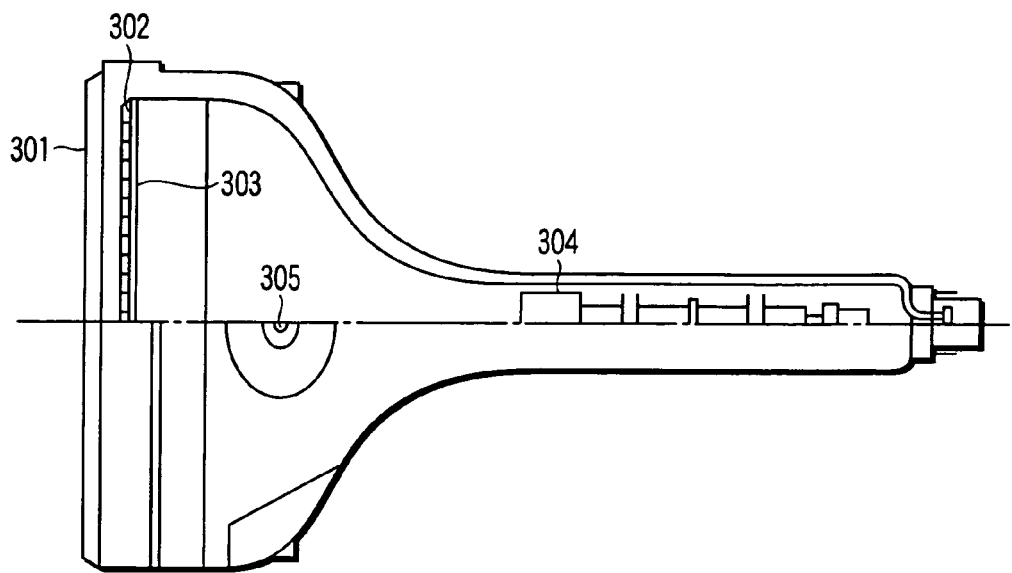
FIG. 3 is a partial cross-sectional view schematically illustrating a light-emitting device according to another embodiment of the present invention.

One example of the construction of such a light-emitting device is schematically shown in FIG. 3 as a cross-sectional view. As shown in FIG. 3, a fluorescent film 302 and an aluminum film 303 as a reflection film are successively deposited on the inner surface of a face plate 301. Further, in order to irradiate an electron beam onto the fluorescent film 302, an electron gun 304 is mounted through an anode 305. Electrons emitted from the electron gun 304 impinge to the fluorescent film 302. The projector shown in FIG. 3 can be manufactured according to the following procedure for example. First of all, a fluorescent substance according to one embodiment of the present invention is coated inside a glass bulb 7 inches in diagonal length, thus forming a fluorescent film. Next, an aluminum film having a thickness of about 0.2 µm is deposited on this fluorescent film by vapor deposition method. Then, the anode and the electron gun are attached to the device, thus accomplishing the manufacture of the projector tube.

This light-emitting device has a large picture plane, thus enabling it to be employed as a television of large picture plane for use in the ordinary home. In the employment of this display, a high voltage and a high electric current are applied to the fluorescent plane of the projector. For example, an accelerating voltage is within a range of 2 kV to 40 kV. Therefore, the fluorescent substance for constructing the fluorescent plane is required to have the following characteristics.

First of all, the fluorescent substance to be coated on the inner surface of projector is required to have luminance/current saturation properties featuring in that even if a high electric current is passed thereto, the luminance thereof would not be saturated. Next, the fluorescent substance is required to stably exhibit light of high luminance even under high temperatures. Namely, since a high power electron beam is irradiated onto the fluorescent film of projector tube, the energy that has not been used for emitting the light will be converted into heat, thus heating the fluorescent substance constituting the fluorescent film up to 100° C. or more. Therefore, the fluorescent substance is required to be such that the luminance thereof can hardly degrade even at high temperatures. Additionally, the fluorescent substance is required to have such a stable crystal structure that the crystal thereof can be hardly destroyed even if it is employed under the condition where such a large electric current as described above is applied thereto.

In order to secure a sufficient luminance and luminance saturation properties under the excitation with high current density, representative fluorescent substances to be employed in a projector tube are formulated as follows. Namely, as for a red fluorescent substance, europium-activated yttrium oxide ($Y_2O_3$:Eu) has been conventionally employed. As for a green fluorescent substance, terbium-activated yttrium silicate fluorescent substance ($Y_2SiO_5$:Tb) has been conventionally employed. As for a blue fluorescent substance, ZnS-based fluorescent substance has been conventionally employed. The ZnS-based fluorescent substance is known as being extremely vulnerable to deterioration as compared with the red fluorescent substance and the green fluorescent substance. Because of this, there has been a problem that deviation of display color generates in the color picture plane. However, when a fluorescent substance according to one embodiment of the present invention is employed as a blue fluorescent substance, it is possible to secure excellent display properties for a long period.

Figure 4A:
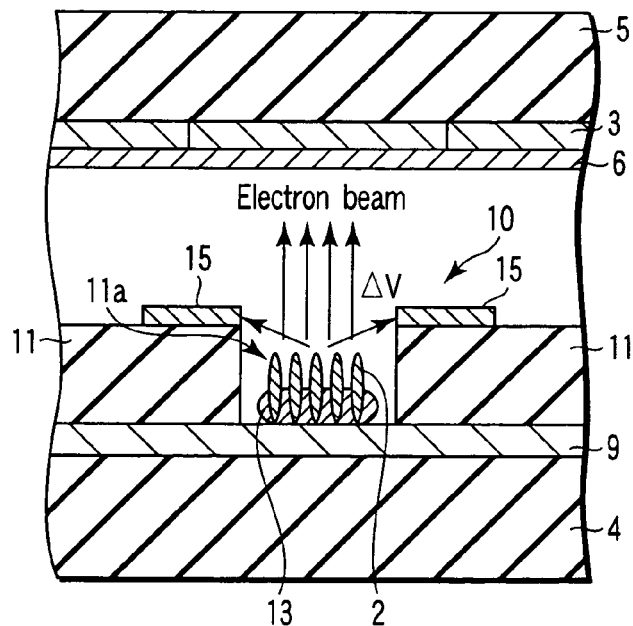
FIG. 4A is a cross-sectional view schematically illustrating a light-emitting device according to a further embodiment of the present invention.
Figure 4B:
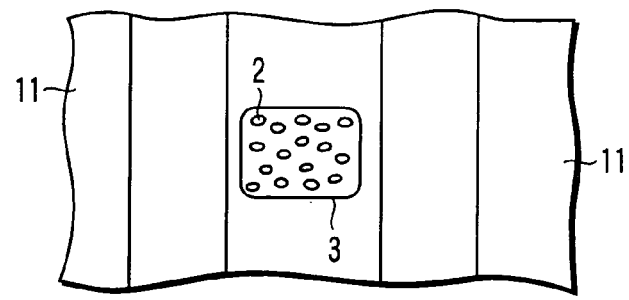
FIG. 4B is a plan view of a light-emitting device according to a further embodiment of the present invention.

The fluorescent substance according to one embodiment of the present invention can be applied to the field emission type display (FED). FIG. 4A illustrates a schematic cross-sectional view of the display device and FIG. 4B shows the plan view thereof. As shown in FIG. 4A, the display device 1 according to one embodiment of the present invention is a field emission type display (FED) using, as an electron source, a carbon nano tube 2 which is formed of a rod-like carbon molecule, wherein a fluorescent substance according to one embodiment of the present invention is employed as a fluorescent substance film 3.

Incidentally, although the carbon nano tube is very fine material whose size in longitudinal direction ranges from several nanometers (nanometer=$10^{-9}$ m) to several tens nanometers, enlarged views thereof are shown in FIGS. 4A and 4B.

As shown in FIG. 4A, the display device 1 comprises a substrate 4 carrying thereon an electron source for emitting electron, and a face plate 5 which is disposed to face the substrate 4. The face plate 5 is formed of a glass substrate and provided with a fluorescent substance film 3 which is formed on the plane of the face plate 5 that faces the substrate 4. Further, on the surface of fluorescent substance film 3, there is deposited an aluminum film 6 functioning as an anode. This fluorescent substance film 3 emits light as electrons emitted from the electron source are impinged against the fluorescent substance film 3. The space between the substrate 4 and the face plate 5 is hermetically sealed by the sidewall (not shown) which is mounted along the peripheries of the substrate 4 and the face plate 5, and hence the space is kept in vacuum.

As shown in FIGS. 4A and 4B, a plurality of emitter elements 10 for emitting electrons are mounted on the substrate 4 and in conformity with each of the layers comprising fluorescent substances, i.e. red, green and blue fluorescent substances. Incidentally, in FIGS. 4A and 4B, only one of these emitter elements is shown. In this emitter elements 10, a cathode 9 and an insulating material 11 are successively laminated. The insulating material 11 is provided with an opening 11a, through which a predetermined region of the cathode 9 is exposed toward the fluorescent substance film 3. As for the substrate 4, it is possible to employ, for example, various kinds of glass substrates such as quartz glass and blue sheet glass, or various kinds of ceramic substrates such as alumina. It is also possible to employ a laminated substrate comprising an insulating layer made, for example, of silicon oxide ($SiO_2$), which is laminated on any of the aforementioned various kinds of substrates.

On a predetermined region of the cathode 9 which is located within the opening 11a, there is disposed the carbon nano tube 2 functioning as an electron source. The fixing of fine materials such as the carbon nano tube 2 to the cathode 9 can be performed according to the following procedure. First of all, a plurality of carbon nano tubes 2 are dispersed in a conductive paste such as a silver paste. The resultant paste is applied drop-wise to the exposed upper surface of the cathode 9 from the opening 11a of insulating material 11 or from any gap. Then, the paste is allowed to cure to form a conductive film 13. As a result, the carbon nano tubes 2 are dispersed and disposed within a predetermined area of the conductive film 13. Namely, the carbon nano tubes 2 as an electron source are disposed on the substrate 4 facing the fluorescent substance film 3, thus forming a predetermined range of electron emitting region.

The carbon nano tubes 2 that have been fixed to the conductive film 13 as described above are configured such that the distal end thereof are protruded from the flat surface of conductive film 13, and an applied voltage $V_f$ (potential difference $\Delta V$) for element is applied between these protruded portions and a control electrode (gate electrode) 15. As a result, electrons are emitted from the distal end of the carbon nano tubes 2. The electrons that have been emitted are then accelerated by an accelerating voltage $V_a$ that has been applied between the cathode 9 and the anode (aluminum film 6) located on the fluorescent substance film 3 side, thus enabling the electrons to impinge against the fluorescent substance film 3. Due to this impingement of electrons, the fluorescent substance film 3 is enabled to emit light.

As already explained above, when a ZnS-based fluorescent substance is employed as a blue fluorescent substance, the deterioration of this blue fluorescent substance would be proceeded very fast as compared with the red fluorescent substance and the green fluorescent substance. Because of this, there has been a problem that deviation of display color generates in the color picture plane. However, when a fluorescent substance according to one embodiment of the present invention is employed as a blue fluorescent substance, it is possible to secure excellent display properties for a long period of time even if the fluorescent substance is exposed to electron beam of high density.

Further, as compared with the case where the conventional ZnS-based fluorescent substance is employed, it is now possible to suppress the generation of decomposed gas of fluorescent substance and to inhibit the contamination of electron source by the decomposed gas of fluorescent substance. As a result, it is now possible to suppress the deterioration with time of the electron emission properties of fluorescent substance.

Next, the present invention will be explained in detail with reference to examples and comparative examples. These examples however are not intended to limit the present invention.

Example 1

$SrCO_3$, AlN, $Si_3N_4$ and $Eu_2O_3$ were employed as starting materials, and these starting materials were weighed to obtain 7.308 g, 38.939 g, 21.047 g and 0.088 g, respectively. Then, these starting materials were mixed together with dehydrated isopropanol (IPA) for 24 hours in a ball mill. After IPA was volatilized and removed by room temperature drying, the mixture was allowed to dry overnight in air atmosphere and at a temperature of 120° C. The resultant mixture was cracked in a mortar and then charged in a molybdenum crucible. The mixture in the crucible was then subjected to sintering in a $N_2$ atmosphere of 7.5 atm. for four hours at a temperature of 1800° C. to synthesize a fluorescent substance of this example. As a result of the chemical analysis, the fluorescent substance of this example was confirmed to have a composition represented by $(Sr_{0.99}Eu_{0.01})Si_9Al_{19}ON_{31}$. This fluorescent substance after the sintering was formed of a white sintered body, and an emission of blue color was observed when it was excited with black light.

Figure 5:
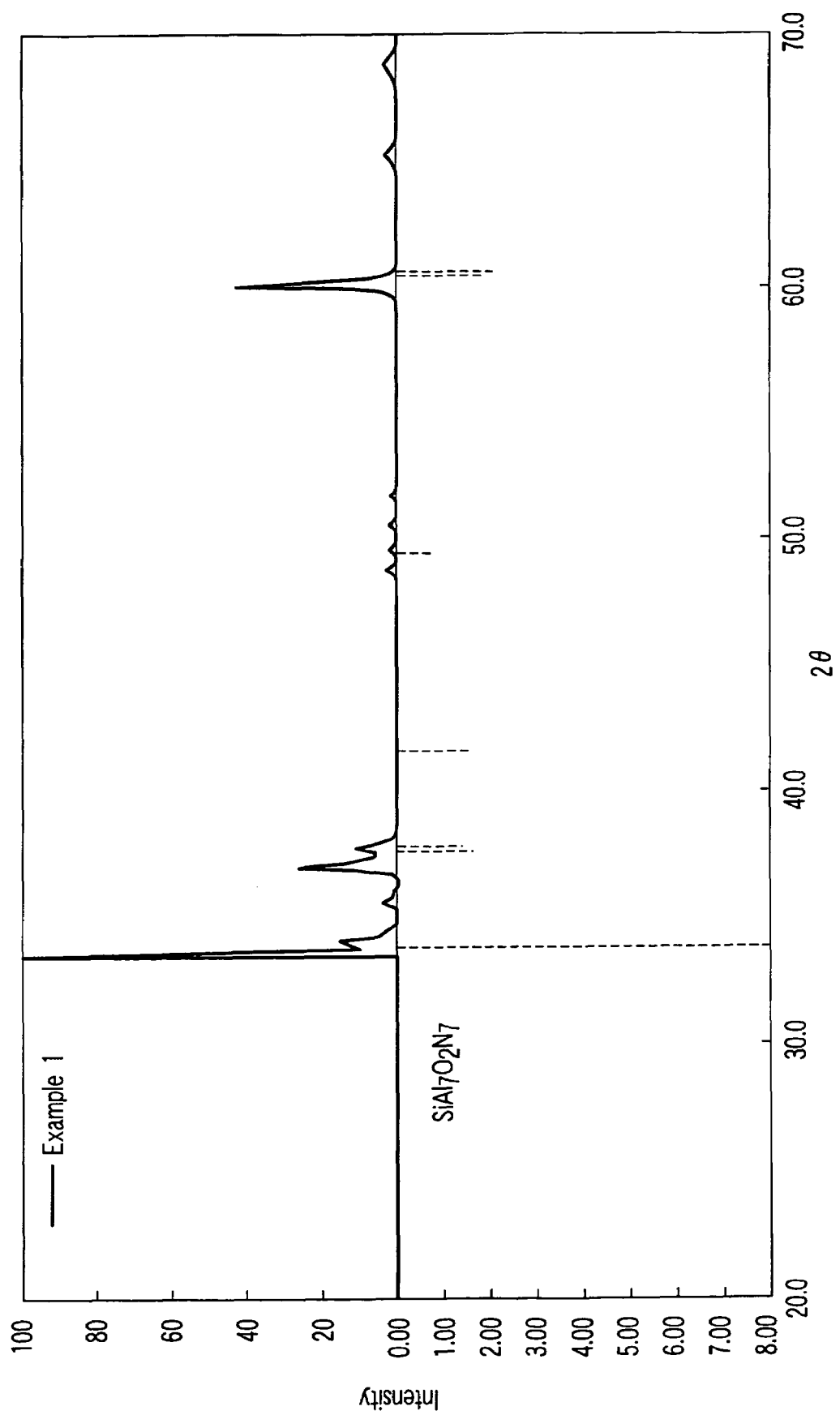
FIG. 5 shows an XRD profile of the fluorescent substance of Example 1.

FIG. 5 shows an XRD profile of the fluorescent substance of Example 1. Based on the facts that the pattern was excellent in symmetry and that the profile was quite agreeable with the pattern of $(AlN)_7(SiO_2)$ polytypoid (JCPDS card #36-0828), the fluorescent substance was confirmed to have a polytypoid structure of 8-layer periodism. Incidentally, the JCPDS card is a data book where peak profiles of various materials which have been obtained by X-ray diffraction method are summarized therein.

Figure 6:
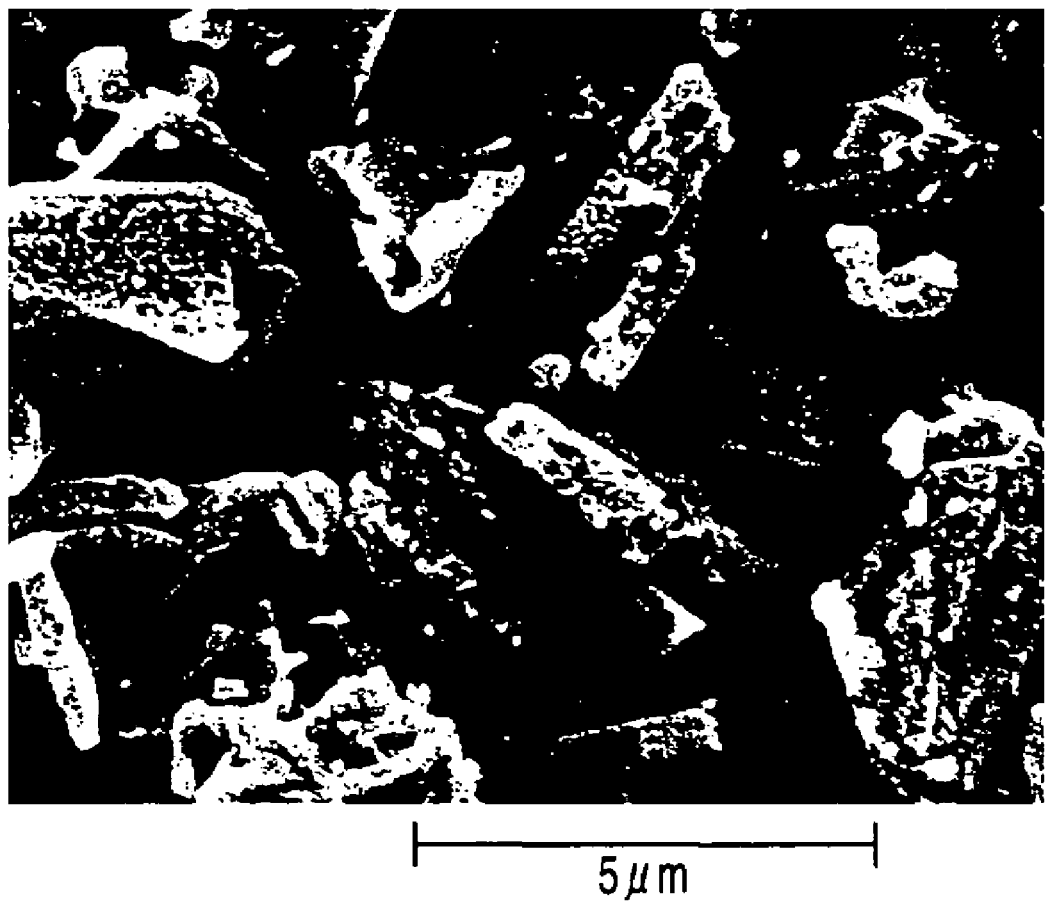
FIG. 6 shows an SEM observation image of the fluorescent substance of Example 1.

FIG. 6 shows an SEM image of the fluorescent substance of Example 1. The observation in this case was performed under the condition of an accelerated voltage of 10 kV. It was confirmed from FIG. 6 that the fluorescent substance of this example was formed of a plate-like granule having a particle diameter of about 0.5 μm in the direction of shorter axis and a particle diameter of about 3 to 5 μm in the direction of the other axis.

Figure 7:
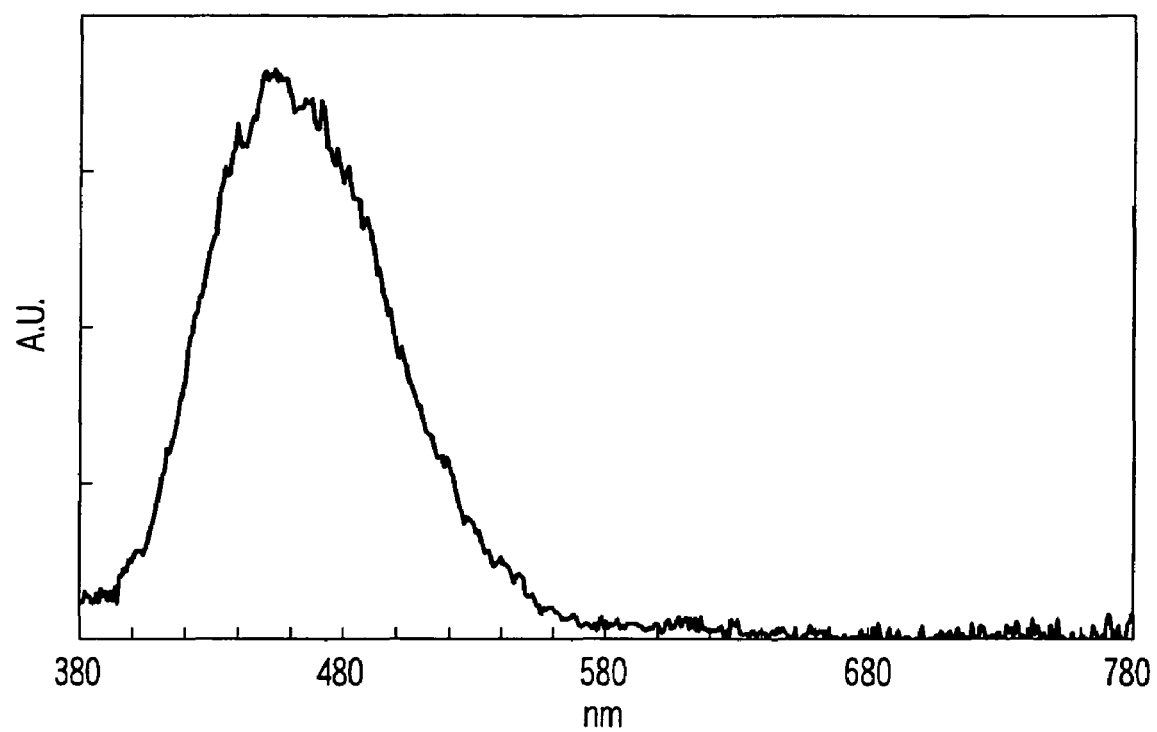
FIG. 7 shows an emission spectrum obtained in the excitation of the fluorescent substance of Example 1 by electron beam.

FIG. 7 shows an emission spectrum of the fluorescent substance of Example 1 which was obtained under the irradiation of electron beam at room temperature (25° C.). The conditions for excitation were set to 10 kV in accelerating voltage, 1.5 μA in raster excitation, and 4.85×6.57 $mm^2$ in the size of raster. The emission spectrum employed herein was measured by using an IMUC-7000G type instantaneous multi-photometer system (Ohtsuka Denshi Co., Ltd.). As shown in FIG. 7, an emission of single band having a peak in the vicinity of 450 nm to 460 nm was obtained. This emission was assumed as being originated from the transition of:

5f→4d of $Eu^{2+}$. The chromaticity at a 2°-visual field under these excitation conditions was a blue emission of (0.153, 0.132).

Figure 8:
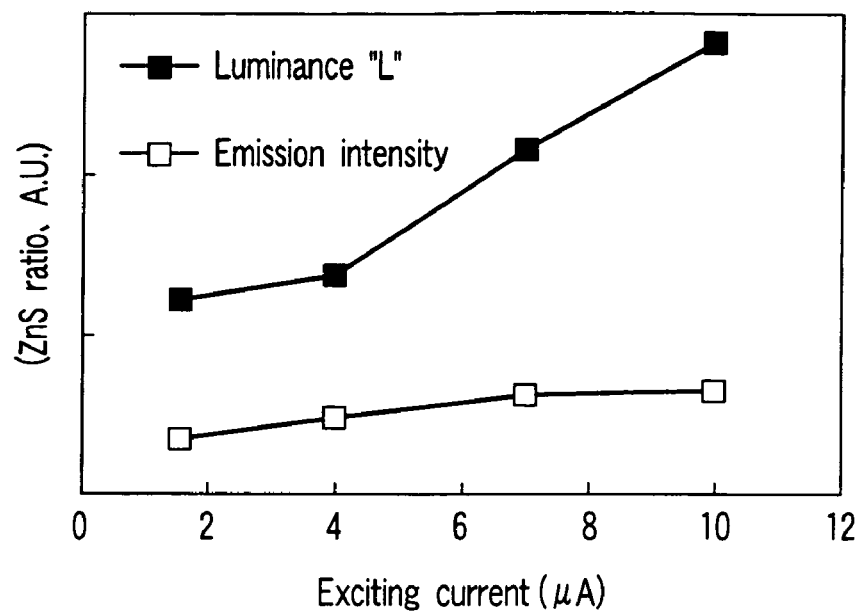
FIG. 8 is a graph illustrating the dependency of emission intensity ratio and of luminance ratio on the excitation energy density in the excitation of the fluorescent substance of Example 1 by electron beam.

In FIG. 8, the peak intensity and the relative values of luminance L of the emission spectrum of the fluorescent substance of Example 1 are summarized. The conditions for excitation were set to 10 kV in accelerating voltage, 1.5-10 μA in raster excitation, and 4.85×6.57 mm² in the size of raster. The ordinate in FIG. 8 denotes relative values based on the values of the conventional electron exciting fluorescent substance ZnS:Ag,Cl. As shown in FIG. 8, as the excitation intensity was increased, the luminance as well as the emission intensity was monotonically increased, thus indicating that the fluorescent substance of this example was more excellent in current saturation properties as compared with those of ZnS-based fluorescent substance.

Example 2

In the same manner as in Example 1, the starting materials which were weighed, mixed together, dried and cracked were placed in a boron nitride crucible. The mixture in the crucible was then subjected, in the same manner as in Example 1, to sintering in a $N_2$ atmosphere of 7.5 atm. for four hours at a temperature of 1800° C. to synthesize a fluorescent substance of this example. As a result of the chemical analysis, the fluorescent substance of this example was confirmed to have a composition represented by $(Sr_{0.99}Eu_{0.01})Si_9Al_{19}ON_{31}$.

Figure 9:
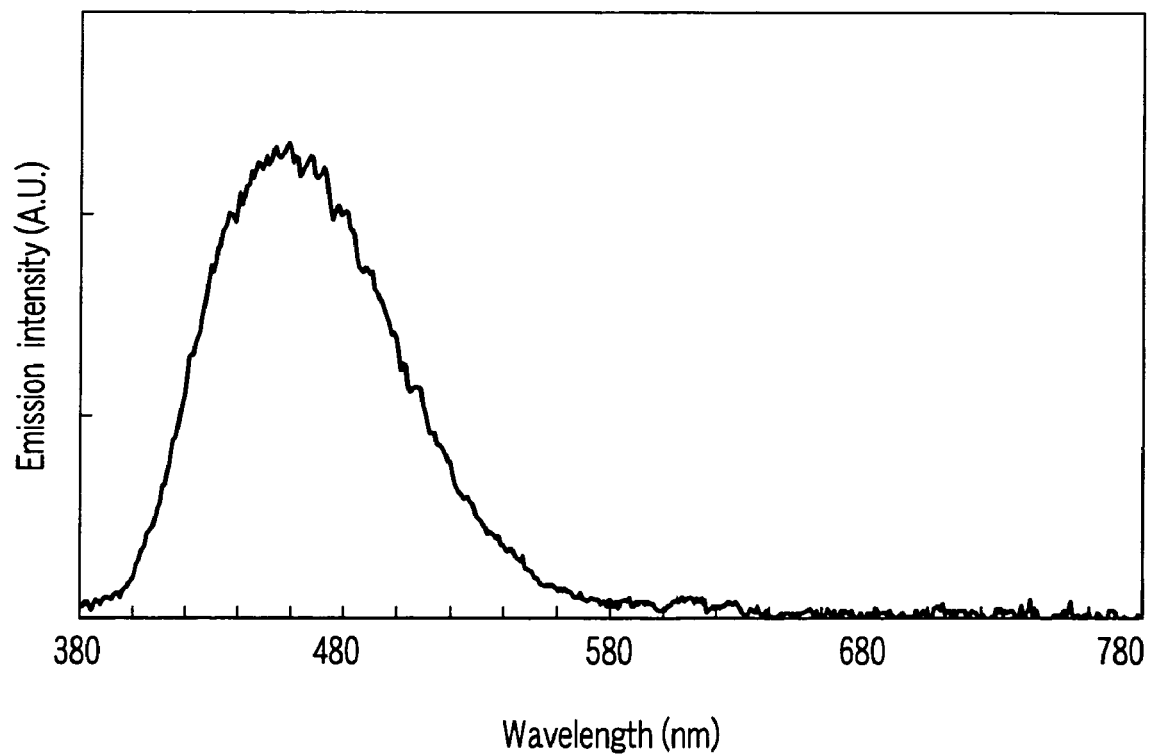
FIG. 9 shows an emission spectrum obtained in the excitation of the fluorescent substance of Example 2 by electron beam.

FIG. 9 shows an electron beam excitation emission spectrum of the fluorescent substance of Example 2. The conditions for excitation were set to 10 kV in accelerating voltage, 1.5 μA in raster excitation, and 4.85×6.57 mm² in the size of raster. As shown in FIG. 9, an emission of single band having a peak in the vicinity of 450 to 460 nm was obtained. This emission was assumed as being originated from the transition of: 5f→4d of $Eu^{2+}$. The chromaticity at a 2°-visual field under these excitation conditions was a blue emission of (0.154, 0.142).

Example 3

The starting materials which were weighed, mixed together, dried, cracked and sintered in the same manner as in Example 1 except that the mixing amount of $SrCO_3$ was changed to 7.234 g and the mixing amount of $Eu_2O_3$ was changed to 0.176 g, thereby synthesizing the fluorescent substance of this example. As a result of the chemical analysis, the fluorescent substance of this example was confirmed to have a composition represented by $(Sr_{0.98}Eu_{0.02})Si_9Al_{19}ON_{31}$.

Example 4

The starting materials which were weighed, mixed together, dried, cracked and sintered in the same manner as in Example 1 except that the mixing amount of $SrCO_3$ was changed to 7.012 g and the mixing amount of $Eu_2O_3$ was changed to 0.440 g, thereby synthesizing the fluorescent substance of this example. As a result of the chemical analysis, the fluorescent substance of this example was confirmed to have a composition represented by $(Sr_{0.95}Eu_{0.05})Si_9Al_{19}ON_{31}$.

Example 5

The starting materials which were weighed, mixed together, dried, cracked and sintered in the same manner as in Example 1 except that the mixing amount of $SrCO_3$ was changed to 6.643 g and the mixing amount of $Eu_2O_3$ was changed to 0.880 g, thereby synthesizing the fluorescent substance of this example. As a result of the chemical analysis, the fluorescent substance of this example was confirmed to have a composition represented by $(Sr_{0.9}Eu_{0.1})Si_9Al_{19}ON_{31}$.

Example 6

The starting materials which were weighed, mixed together, dried, cracked and sintered in the same manner as in Example 1 except that the mixing amount of $SrCO_3$ was changed to 5.905 g and the mixing amount of $Eu_2O_3$ was changed to 1.760 g, thereby synthesizing the fluorescent substance of this example. As a result of the chemical analysis, the fluorescent substance of this example was confirmed to have a composition represented by $(Sr_{0.8}Eu_{0.2})Si_9Al_{19}ON_{31}$.

Example 7

The starting materials which were weighed, mixed together, dried, cracked and sintered in the same manner as in Example 1 except that the mixing amount of $SrCO_3$ was changed to 3.691 g and the mixing amount of $Eu_2O_3$ was changed to 4.399 g, thereby synthesizing the fluorescent substance of this example. As a result of the chemical analysis, the fluorescent substance of this example was confirmed to have a composition represented by $(Sr_{0.5}Eu_{0.5})Si_9Al_{19}ON_{31}$.

Example 8

AlN, $Si_3N_4$ and $Eu_2O_3$ were weighed to obtain 38.939 g, 21.047 g and 8.798 g, respectively. Then, these raw materials were mixed together, dried, cracked and sintered in the same manner as in Example 1, thereby synthesizing the fluorescent substance of this example. As a result of the chemical analysis, the fluorescent substance of this example was confirmed to have a composition represented by $EuSi_9Al_{19}ON_{31}$.

Following Table 1 shows the results of analysis of the oxygen composition of the fluorescent substances obtained in Examples 1, 3, 4 and 5. This analysis was performed by inert gas fusion-infrared absorption method.

TABLE 1

| Samples | | Unit | Sr | Eu | Al | Si | O | N | C |
|---|---|---|---|---|---|---|---|---|---|
| Examples | 1 | wt. % | 6.67 | 0.12 | 41.00 | 17.73 | 2.72 | 31.66 | 0.10 |
| | | mol | 1.00 | 0.01 | 19.88 | 8.26 | 2.22 | 29.55 | 0.11 |
| | 3 | wt. % | 6.66 | 0.24 | 40.73 | 17.93 | 2.74 | 31.63 | 0.08 |
| | | mol | 0.99 | 0.02 | 19.76 | 8.36 | 2.24 | 29.56 | 0.08 |
| | 4 | wt. % | 6.23 | 0.56 | 41.47 | 17.20 | 2.73 | 31.69 | 0.11 |
| | | mol | 0.93 | 0.05 | 20.10 | 8.01 | 2.23 | 29.58 | 0.12 |
| | 5 | wt. % | 5.95 | 1.12 | 40.83 | 17.54 | 2.82 | 31.67 | 0.08 |
| | | mol | 0.89 | 0.10 | 19.83 | 8.18 | 2.31 | 29.63 | 0.08 |

It will be seen from Table 1 that oxygen was included in these fluorescent substances at about 3% by weight.

Figure 10:
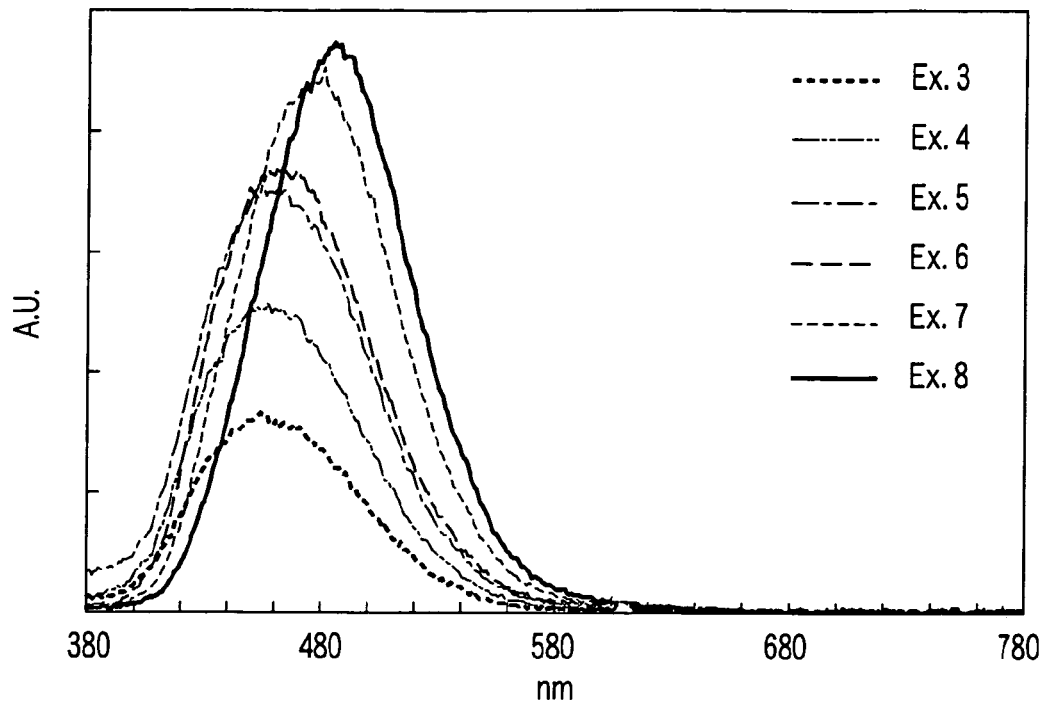
FIG. 10 shows emission spectrums obtained in the excitation of the fluorescent substances of Examples 3 to 8 by electron beam.

FIG. 10 shows an electron beam excitation emission spectrum of each of the fluorescent substances of Examples 3-8. The conditions for excitation were set to 10 kV in accelerating voltage, 1.5 μA in raster excitation, and 4.85×6.57 mm² in the size of raster. As shown in FIG. 10, an emission of single band having a peak in the vicinity of 450 to 460 nm was obtained.

It will be recognized that as the concentration of Eu was increased, the wavelength of peak was increased and the intensity of emission was also increased. This emission was assumed as being originated from the transition of: 5f→4d of $Eu^{2+}$. The peak wavelength, the chromaticity at a 2°-visual field under these excitation conditions, and the color of emission, which were obtained from these fluorescent substances of Examples 3-8, are summarized in the following Table 2.

TABLE 2

|  | Conc. of Eu | Peak wavelength | x | y | Emission color |
|---|---|---|---|---|---|
| Examples 3 | 0.02 | 453 nm | 0.147 | 0.131 | Blue |
| Examples 4 | 0.05 | 455 nm | 0.145 | 0.132 | Blue |
| Examples 5 | 0.1 | 455 nm | 0.145 | 0.141 | Blue |
| Examples 6 | 0.2 | 464 nm | 0.147 | 0.153 | Blue |
| Examples 7 | 0.5 | 482 nm | 0.142 | 0.209 | Blue |
| Examples 8 | 1 | 486 nm | 0.144 | 0.272 | Greenish blue |

It will be recognized, as shown in Table 2, that by changing the concentration of Eu, fluorescent substances having desired emission peak wavelength and desired chromaticity can be obtained.

Figure 11:
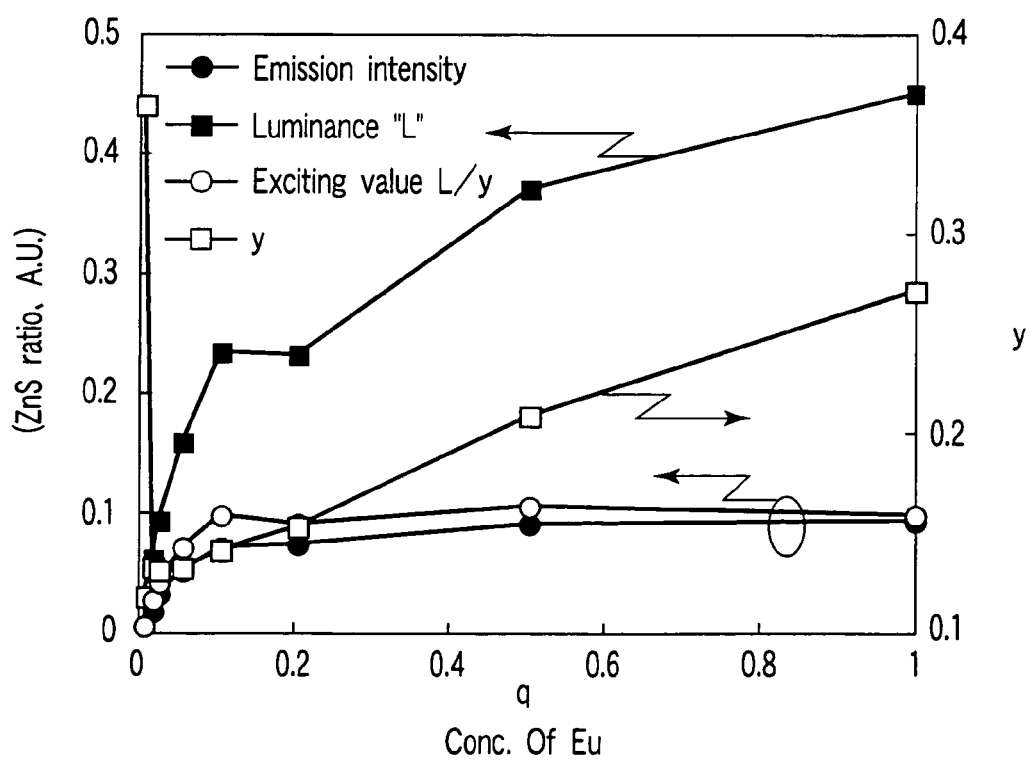
FIG. 11 is a graph illustrating the luminescence center element concentration dependency of emission intensity, luminance "L", y-value and excitation value "L/y" in the excitation of the fluorescent substances of Examples 3 to 8 by electron beam.

FIG. 11 shows the Eu concentration dependency of emission intensity, luminance "L", y-value and excitation value "L/y" in the excitation of the fluorescent substances of Examples 3 to 8 by electron beam. The conditions for the excitation were made the same as described above. It will be recognized from FIG. 11 that it was possible, through the alteration of Eu concentration, to widely modify the emission intensity, luminance "L", excitation value "L/y" and y-value.

Example 9

In the same manner as in Example 8, the starting materials which were weighed, mixed together, dried and cracked were placed in a carbon crucible. The mixture in the crucible was then subjected, in the same manner as in Example 1, to sintering to synthesize a fluorescent substance having a composition represented by $EuSi_9Al_{19}ON_{31}$.

Figure 12:
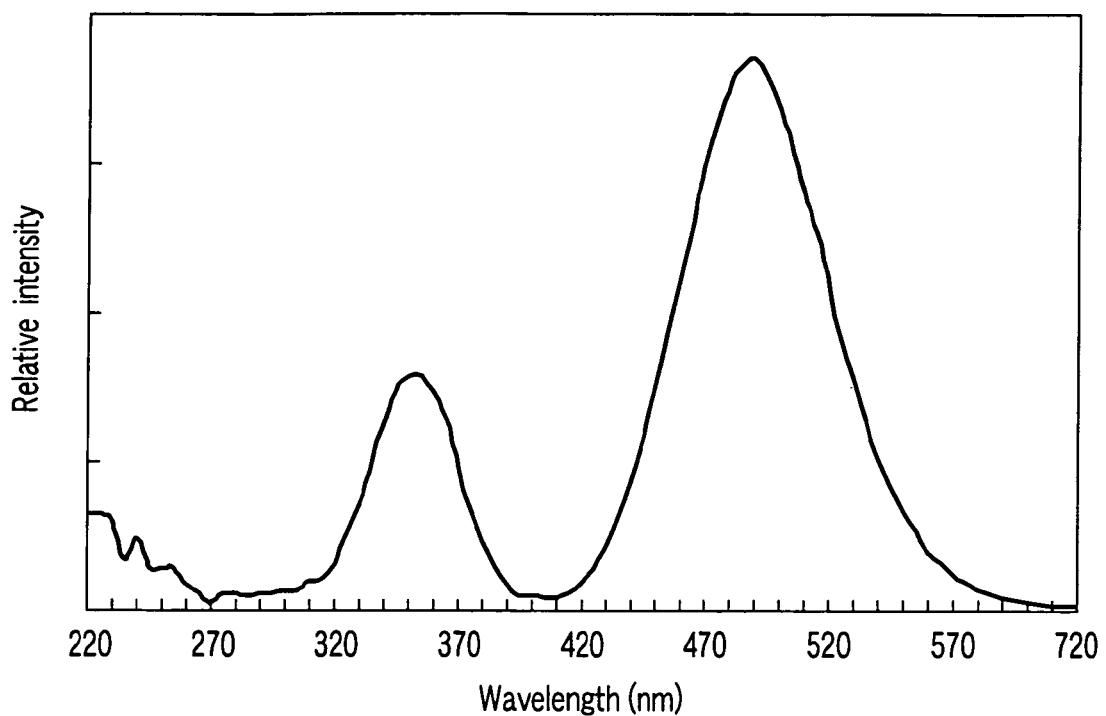
FIG. 12 shows an emission spectrum obtained in the excitation of the fluorescent substance of Example 8 by a light having a wavelength of 350 nm.
Figure 13:
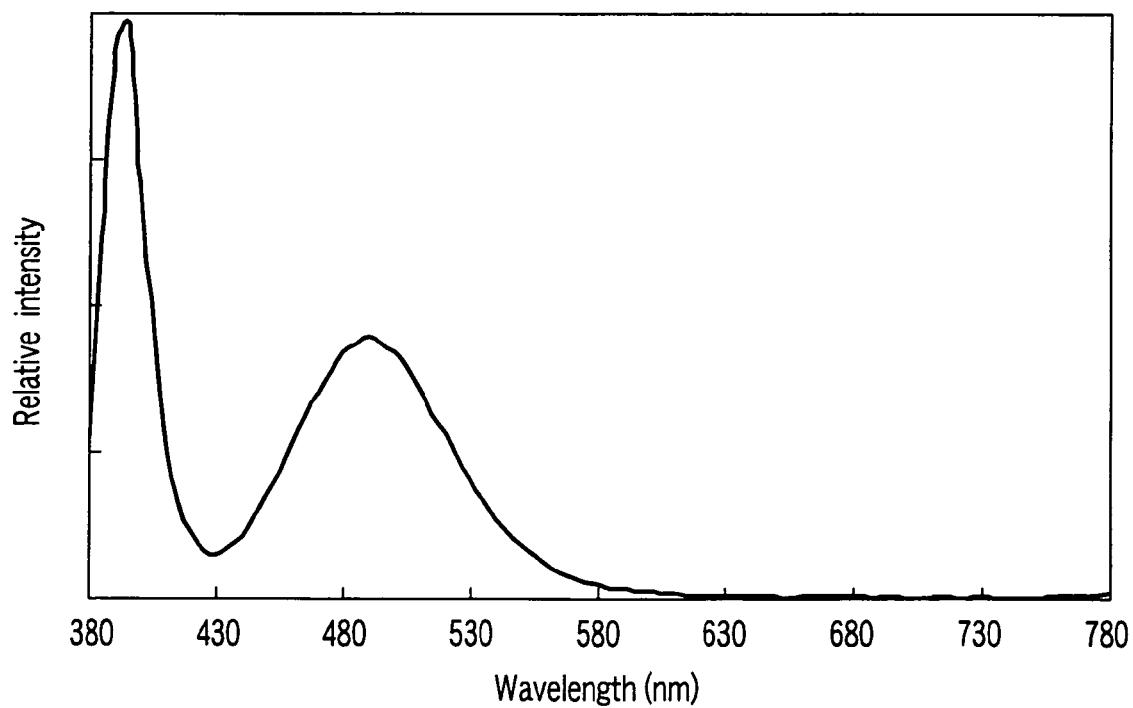
FIG. 13 shows an emission spectrum obtained in the excitation of the fluorescent substance of Example 8 by a light having a wavelength of 393 nm.

The fluorescent substance thus obtained was excited by a UV lamp having a peak wavelength of 350 nm, the emission spectrum thus obtained being illustrated in FIG. 12. FIG. 13 shows an emission spectrum obtained in the excitation of the fluorescent substance of Example 8 by using a light-emitting diode having a peak wavelength of 393 nm. In FIGS. 12 and 13, the bands exhibiting peaks at 350 nm and 393 nm, respectively, were originated due to the reflection of exciting beam. As in the case of the excitation with electron beam, it was possible to obtain an emission of single band having a peak wavelength at 490 nm. The values of index of absorption, quantum efficiency and emission efficiency in each wavelength are summarized in the following Table 3.

TABLE 3

| Excitation wavelength | Absorbency | Quantum efficiency | Emission efficiency |
|---|---|---|---|
| 350 nm | 0.90 | 0.49 | 0.44 |
| 393 nm | 0.78 | 0.51 | 0.42 |

Comparative Example 1

$SrCO_3$, $Si_3N_4$ and $Eu_2O_3$ were weighed to obtain 26.573 g, 23.385 g and 3.519 g, respectively. Then, these starting materials were mixed together in a ball mill. The resultant mixture powder was then charged in a carbon crucible. The mixture in the crucible was then subjected to sintering in a $N_2$ atmosphere of 7 atm. for eight hours at a temperature of 1650° C. to synthesize a fluorescent substance of this example. As a result of the chemical analysis, the fluorescent substance of this example was confirmed to have a composition represented by $(Sr_{0.9}Eu_{0.1})_2Si_5N_8$. This fluorescent substance thus obtained was formed of a vermillion sintered body, and an emission of red color was observed when it was excited with black light.

The fluorescent substance of Example 9 was excited while raising the temperature thereof from room temperature up to 200° C. by using a heater, thereby measuring the fluctuation of emission spectrum. In this excitation, a light-emitting diode having a peak wavelength of 393 nm was employed.

Figure 14:
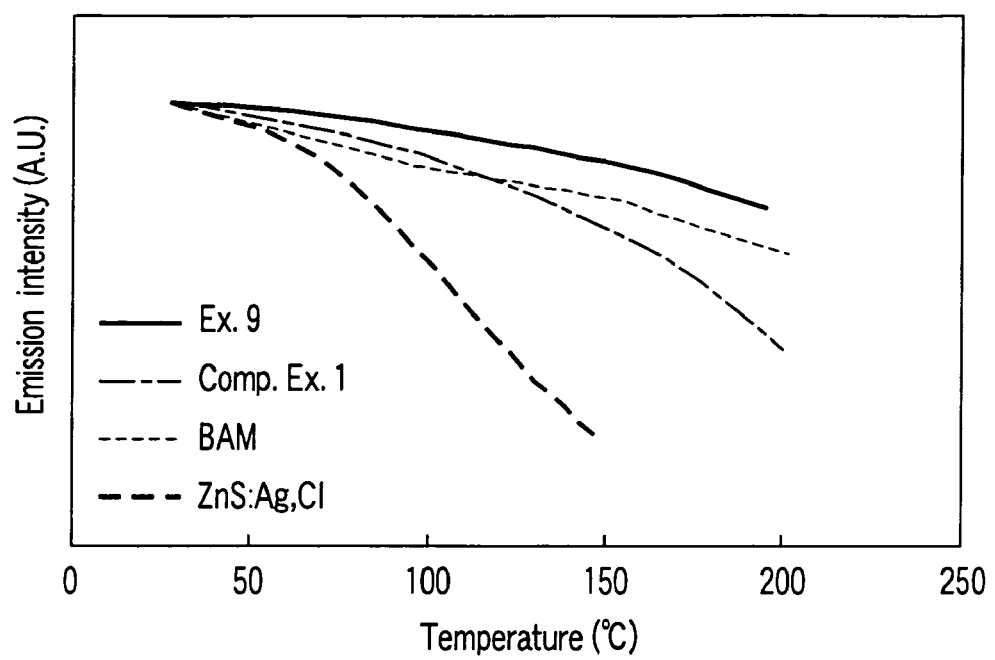
FIG. 14 is a graph illustrating the relationship between temperature and emission intensity as the fluorescent substances of Example 9 and Comparative Example 1, the BAM fluorescent substance and ZnS:Ag,Cl fluorescent substance were excited by a light having a wavelength of 393.

FIG. 14 shows the temperature dependency of the emission intensity at a peak wavelength of 490 nm. For the purpose of comparison, FIG. 14 also shows the temperature dependency of the emission intensity which was obtained from each of marketed BAM fluorescent substance ($BaMgAl_{10}O_{17}$:Eu), ZnS:Ag,Cl and $Sr_2Si_5N_8$:Eu of Comparative Example 1 at a peak wavelength of 445, 444 and 652 nm, respectively. The y-axis of FIG. 14 denotes values which were normalized based on the emission intensity of each of these fluorescent substances at room temperature, which was defined as 1.

The graph of FIG. 14 indicates that the fluorescent substance of Example 9 was minimal in deterioration of emission intensity even under high temperature conditions of as high as 200° C. It will be recognized from these results that as compared with BAM, ZnS:Ag,Cl and $Sr_2Si_5N_8$:Eu having the same nitride matrix, the fluorescent substance according to the embodiment of the present invention was very superior in temperature characteristic.

Example 10

In the same manner as in Example 5, the starting materials which were weighed, mixed together, dried and cracked were subjected to sintering in a $N_2$ atmosphere of 7.5 atm. for four hours at a temperature of 1900° C. to synthesize a fluorescent substance of this example. As a result of the chemical analysis, the fluorescent substance of this example was confirmed to have a composition represented by $(Sr_{0.9}Eu_{0.1})Si_9Al_{19}ON_{31}$.

Figure 15:
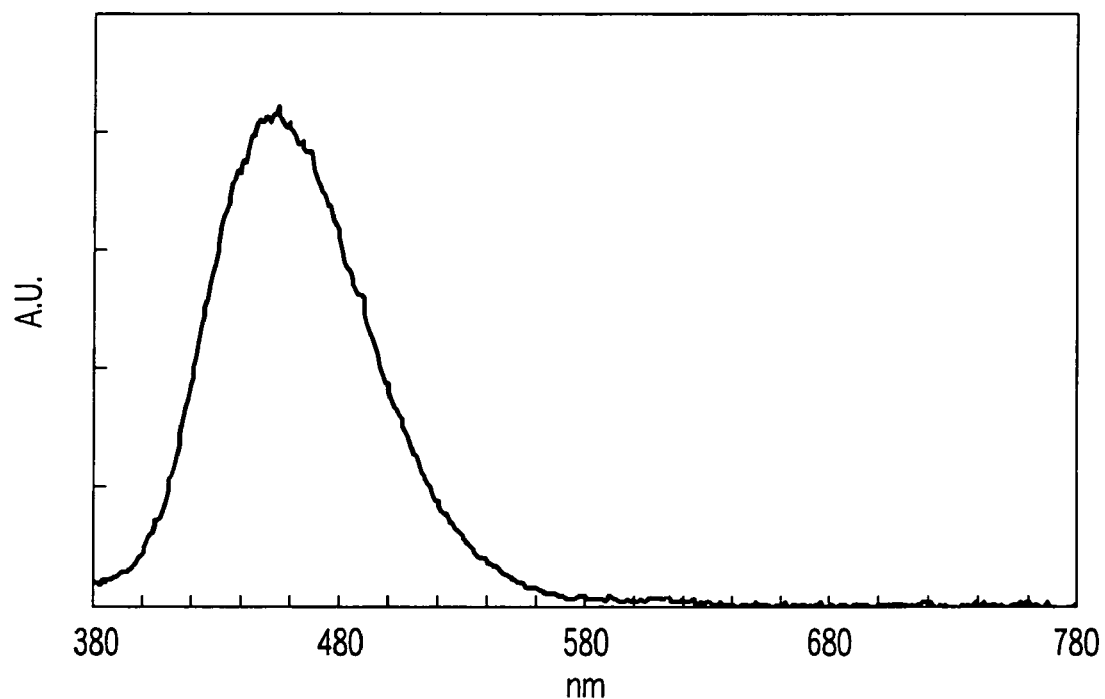
FIG. 15 shows an emission spectrum obtained in the excitation of the fluorescent substance of Example 10 by electron beam.

FIG. 15 shows an electron beam excitation emission spectrum of the fluorescent substance of Example 10. The conditions for excitation were set to 10 kV in accelerating voltage, 1.5 μA in raster excitation, and 4.85×6.57 $mm^2$ in the size of raster. As shown in FIG. 15, an emission of single band having a peak in the vicinity of 450 to 460 nm was obtained. This emission was assumed as being originated from the transition of: 5f→4d of $Eu^{2+}$. The chromaticity at a 2°-visual field under these excitation conditions was a blue emission of (0.148, 0.112).

Figure 16:
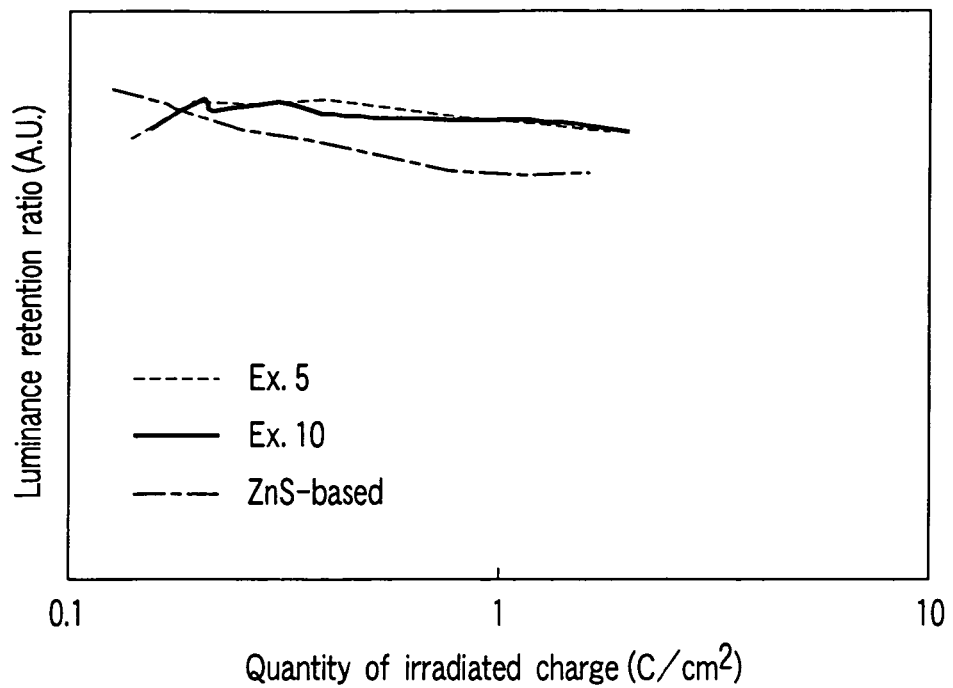
FIG. 16 shows the dependency of luminance retention ratio on the quantity of emitted electric charge in the excitation of the fluorescent substances of Examples 5 and 10 by electron beam.

By sedimentation method, the fluorescent substances of Examples 5 and 10 were respectively deposited on a glass substrate to form a fluorescent substance film. Then, by vacuum deposition method, an aluminum thin film having a thickness of 100 nm was formed, as a metal back, on each of the fluorescent substance films. To these fluorescent substance films thus formed, raster electron beam was irradiated to measure the changes with time of luminance at room temperature. The conditions for this irradiation were: 10 kV in accelerating voltage and 70 μA in current (12 μA/cm² in current density) in a vacuum chamber of the order of $10^{-6}$ Pa in degree of vacuum. The results obtained are shown in FIG. 16. For the purpose of comparison, the changes with time of luminance of marketed ZnS-based fluorescent substance was also measured in the same manner, the results being also shown in FIG. 16. The ordinate of FIG. 16 denotes values of luminance which were normalized based on the luminance at the moment of irradiating 0.2 C of electron beam to each of these fluorescent substances, which was defined as 1. It will be seen from FIG. 16 that the fluorescent substances according to one embodiment of the present invention were very minimal in deterioration of luminance as compared with the ZnS-based fluorescent substance.

Example 11

$SrCO_3$, AlN, $Si_3N_4$ and $MnCO_3$ were weighed to obtain 7.308 g, 38.939 g, 21.047 g and 0.057 g, respectively. Then, these raw materials were mixed together, dried, cracked and sintered in the same manner as in Example 2, thereby synthesizing the fluorescent substance of this example. As a result of the chemical analysis, the fluorescent substance of this example was confirmed to have a composition represented by $(Sr_{0.99}Mn_{0.01})Si_9Al_{19}ON_{31}$.

Example 12

The starting materials which were weighed, mixed together, dried, cracked and sintered in the same manner as in Example 2 except that the mixing amount of $SrCO_3$ was changed to 7.234 g and the mixing amount of $MnCO_3$ was changed to 0.115 g, thereby synthesizing the fluorescent substance of this example. As a result of the chemical analysis, the fluorescent substance of this example was confirmed to have a composition represented by $(Sr_{0.98}Mn_{0.02})Si_9Al_{19}ON_{31}$.

Example 13

The starting materials which were weighed, mixed together, dried, cracked and sintered in the same manner as in Example 2 except that the mixing amount of $SrCO_3$ was changed to 7.012 g and the mixing amount of $MnCO_3$ was changed to 0.287 g, thereby synthesizing the fluorescent substance of this example. As a result of the chemical analysis, the fluorescent substance of this example was confirmed to have a composition represented by $(Sr_{0.95}Mn_{0.05})Si_9Al_{19}ON_{31}$.

Example 14

The starting materials which were weighed, mixed together, dried, cracked and sintered in the same manner as in Example 2 except that the mixing amount of $SrCO_3$ was changed to 6.643 g and the mixing amount of $MnCO_3$ was changed to 0.575 g, thereby synthesizing the fluorescent substance of this example. As a result of the chemical analysis, the fluorescent substance of this example was confirmed to have a composition represented by $(Sr_{0.9}Mn_{0.1})Si_9Al_{19}ON_{31}$.

Figure 17:
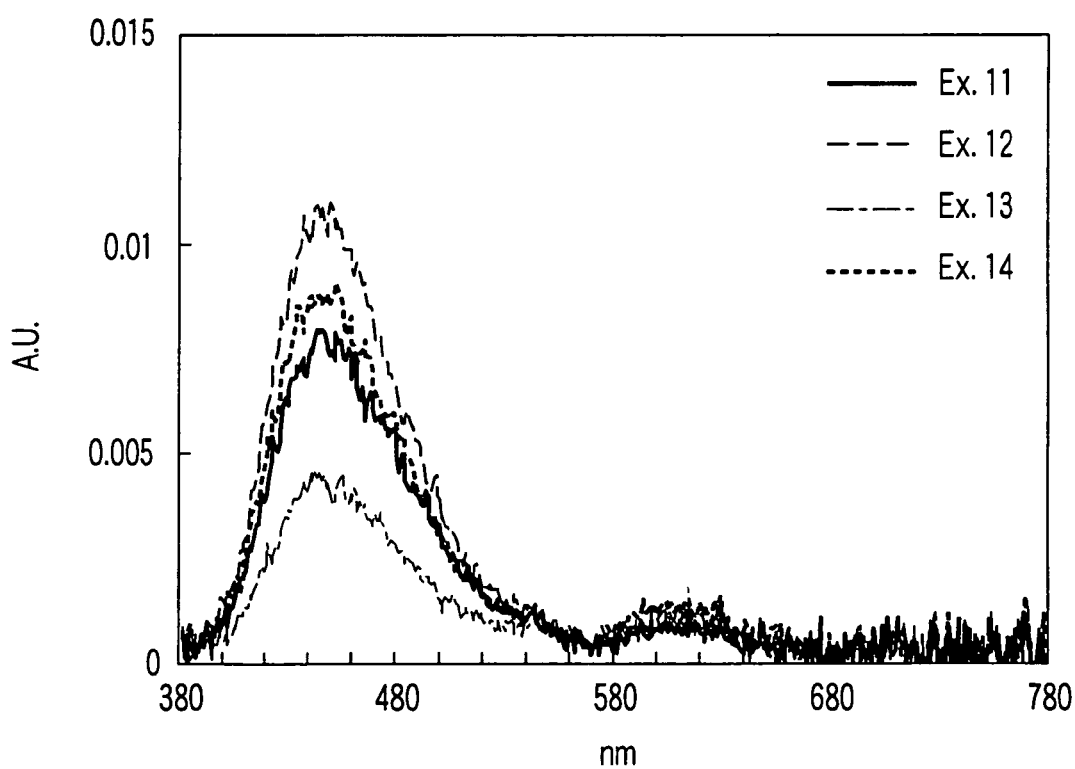
FIG. 17 shows emission spectrums obtained in the excitation of the fluorescent substances of Examples 11 to 14 by electron beam.

The fluorescent substances of Examples 11-14 were respectively excited by electron beam, the emission spectrum thus obtained being illustrated in FIG. 17. The conditions for excitation were set to 10 kV in accelerating voltage, 1.5 μA in raster excitation, and 4.85×6.57 mm² in the size of raster. As shown in FIG. 17, an emission of single band having a peak in the vicinity of 450 nm was obtained. Further, a weak emission was also obtained in the vicinity of 600 nm. The chromaticity (x, y) at a 2°-visual field under these excitation conditions, and the color of emission are summarized in the following Table 4.

TABLE 4

|  | Conc. of Mn | x | y | Emission color |
| --- | --- | --- | --- | --- |
| Example 11 | 0.01 | 0.187 | 0.130 | Purplish bule |
| Example 12 | 0.02 | 0.184 | 0.118 | Purplish bule |
| Example 13 | 0.05 | 0.220 | 0.156 | Bluish purple |
| Example 14 | 0.1 | 0.198 | 0.126 | Purplish bule |

It will be recognized from the results shown in Table 4 that by changing the concentration of Mn, fluorescent substances exhibiting an optional emission color ranging from purplish blue to bluish purple can be obtained.

Example 15

$SrCO_3$, AlN, $Si_3N_4$ and $MnCO_3$ were weighed to obtain 7.308 g, 38.939 g, 21.047 g and 0.057 g, respectively. Then, these raw materials were mixed together, dried, cracked and sintered in the same manner as in Example 1, thereby synthesizing the fluorescent substance of this example. As a result of the chemical analysis, the fluorescent substance of this example was confirmed to have a composition represented by $(Sr_{0.99}Mn_{0.01})Si_9Al_{19}ON_{31}$.

Figure 18:
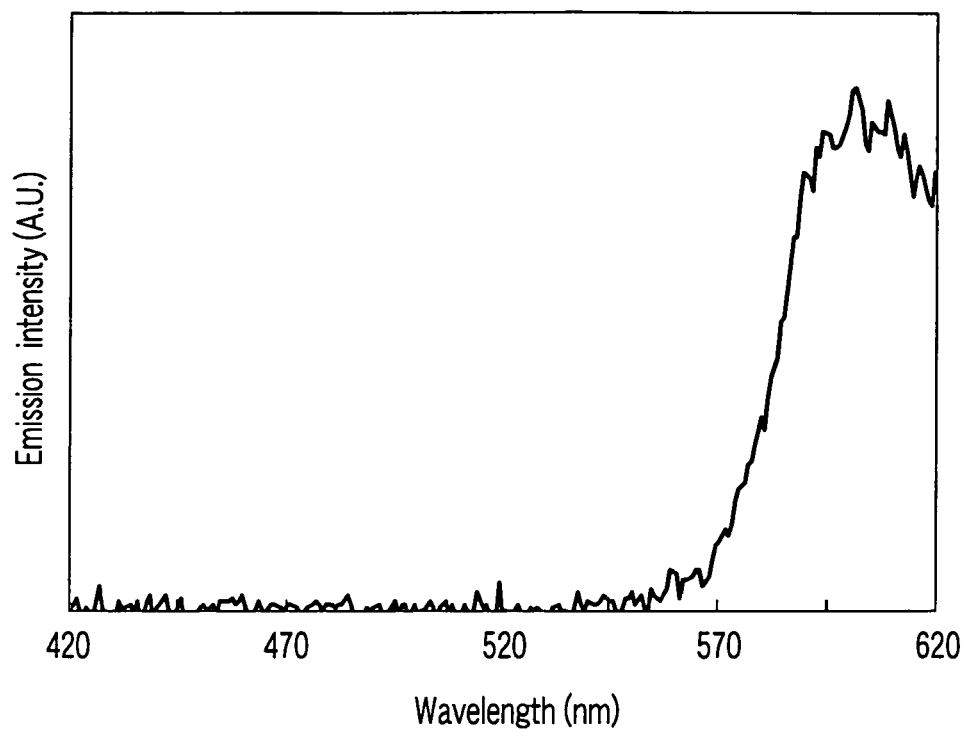
FIG. 18 shows an emission spectrum obtained in the excitation of the fluorescent substance of Example 15 by a light having a wavelength of 245 nm.

The fluorescent substance thus obtained in Example 15 was excited by a UV lamp having a peak wavelength of 245 nm, the emission spectrum thus obtained being illustrated in FIG. 18. As shown in FIG. 18, it was possible to obtain a red emission having a peak at 610 nm.

Examples 16-19

The fluorescent substances of Examples 16-19 were synthesized according to the same procedures as those of Example 1 except that Eu and Mn were employed as a luminescence center element and that the concentration of Eu as well as the concentration of Mn were changed as shown in the following Table 5. The fluorescent substances of these examples were all found to have a composition represented by $\{Sr_{1-q}(Eu_{1-w}Mn_w)_q\}Si_9Al_{19}ON_{31}$.

TABLE 5

|  | Conc. of Eu q(1 − w) | Conc. of Mn qw |
| --- | --- | --- |
| Example 16 | 0.1 | 0.01 |
| Example 17 | 0.1 | 0.02 |
| Example 18 | 0.2 | 0.01 |
| Example 19 | 0.2 | 0.02 |

Figure 19:
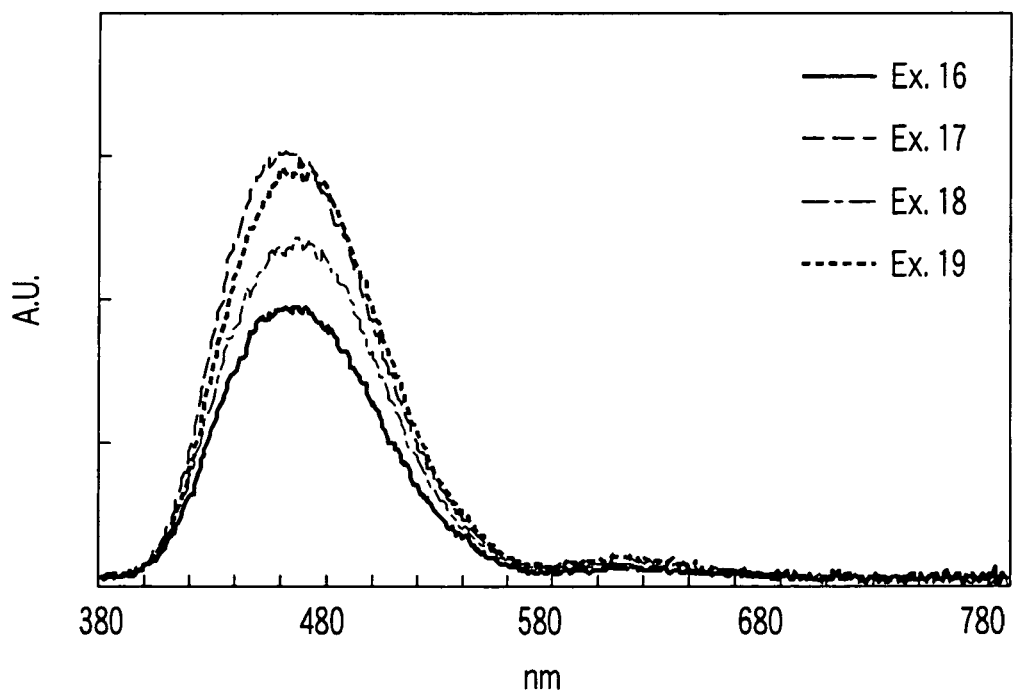
FIG. 19 shows emission spectrums obtained in the excitation of the fluorescent substances of Examples 16 to 19 by electron beam.

The fluorescent substances after the sintering were all formed of white powder and capable of emitting a blue emission as they were excited by a UV lamp. The fluorescent substances of Examples 16-19 were respectively excited by electron beam under the conditions of: 10 kV in accelerating voltage, 1.5 μA in raster excitation, and 4.85×6.57 mm² in the size of raster. The emission spectrums obtained are shown in FIG. 19, and the chromaticity at a 2°-visual field is shown in FIG. 20. It will be recognized that it was possible with the employment of all of these fluorescent substances to obtain a blue emission having a peak in the vicinity of 450 to 470 nm and in the vicinity of 610 nm.

Examples 20-23

The fluorescent substances of Examples 20-23 were synthesized according to the same procedures as those of Example 1 except that not only the kinds of alkaline earth metal to be included as M' in the fluorescent substance but also the concentration of Eu was changed as shown in the following Table 6. The fluorescent substances thus obtained were all found to have a composition represented by $(M'_{1-q}Eu_q)Si_9Al_{19}ON_{31}$.

TABLE 6

|  | M' species | Conc. of Eu (q) |
|---|---|---|
| Example 20 | Ba | 0.05 |
| Example 21 | Ba | 0.1 |
| Example 22 | Ca | 0.05 |
| Example 23 | Ca | 0.1 |

The fluorescent substances of Examples 20 and 21 were all formed of white substance and capable of emitting a blue emission as they were excited by a UV lamp. Further, the fluorescent substances of Examples 22 and 23 were all formed of yellow substance and capable of emitting a yellow emission as they were excited by a UV lamp. The fluorescent substances of Examples 20-23 were respectively excited by electron beam under the conditions of: 10 kV in accelerating voltage, 1.5 μA in raster excitation, and 4.85×6.57 mm² in the size of raster to measure the chromaticity thereof at a 2°-visual field. The results obtained are shown in FIG. 21. FIG. 21 also shows the results of Examples 4 and 5. It will be recognized from these results that it was possible to obtain desired x-value and y-value by changing the kinds and concentration of metal M'.

According to one aspect of the present invention, there is provided a fluorescent substance which is excellent in temperature characteristics. According to another aspect of the present invention, there is provided a fluorescent substance which is excellent in luminance saturation property under the excitation with a high current density, in temperature characteristic and in luminance deterioration characteristic under the irradiation of electron beam. According to a further aspect of the present invention, there is provided a light-emitting device where any of these fluorescent substances are employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fluorescent substance comprising:
   a matrix composed of a compound having an AlN polytypoid structure represented by the following general formula (1); and
   a luminescence center element:

$$(Al,M)_a(N,X)_b \quad (1)$$

wherein a and b are positive values, X is at least one selected from oxygen and carbon, and M in general formula (1) is composed of Si and Sr.

2. The fluorescent substance according to claim 1, wherein X in the general formula (1) is oxygen.

3. The fluorescent substance according to claim 1, wherein the luminescence center element is at least one of Eu and Mn and exhibits an emission peak falling within the range of 400 to 700 nm as the fluorescent substance is excited by an electron energy.

4. The fluorescent substance according to claim 1, wherein the luminescence center element is at least one of Eu and Mn and exhibits an emission peak falling within the range of 400 to 700 nm as the fluorescent substance is excited by a light having a wavelength of 250 nm to 500 nm in wavelength.

5. The fluorescent substance according to claim 1, wherein the luminescence center element is included at an amount of 0.1 to 40 mol % based on a total quantity of Al and M.

6. A fluorescent substance comprising:
   a matrix composed of a compound having an AlN polytypoid structure represented by the following general formula (1); and
   a luminescence center element:

$$(Al,M)_a(N,X)_b \quad (1)$$

wherein M is at least one selected from the group consisting of Si, Ge, alkaline earth metals and rare earth metals; a and b are positive values, X is oxygen, and the content of oxygen in the matrix is within the range of 0.3% to 30% by weight.

7. The fluorescent substance according to claim 6, wherein the luminescence center element is at least one of Eu and Mn and exhibits an emission peak falling within the range of 400 to 700 nm as the fluorescent substance is excited by an electron energy.

8. The fluorescent substance according to claim 6, wherein the luminescence center element is at least one of Eu and Mn and exhibits an emission peak falling within the range of 400 to 700 nm as the fluorescent substance is excited by a light having a wavelength of 250 nm to 500 nm in wavelength.

9. The fluorescent substance according to claim 6, wherein the luminescence center element is included at an amount of 0.1 to 40 mol % based on a total quantity of Al and M.

10. A fluorescent substance comprising:
    a matrix composed of a compound having an AlN polytypoid structure represented by the following general formula (2);
    and a luminescence center element:

$$M'_{2/v}Al_{3n+p}Si_{10-p}N_{3n+14-p}O_p \quad (2)$$

wherein, M' is a metal selected from the group consisting of alkaline earth metals and rare earth metals; v is an ionic valency of the metal M', and p and n are values satisfying conditions of $0<p<10$, $1 \leq n$, respectively.

11. The fluorescent substance according to claim 10, wherein v in the general formula (2) is 2, n in the general formula (2) is 6, and at least part of the M' is replaced by a luminescence center element Q, thus enabling the compound to be represented by the following general formula (3):

$$(M'_{1-q}Q_q)Si_{10-p}Al_{18+p}N_{32-p}O_p \quad (3)$$

wherein, p and q are values satisfying conditions of $0<p<10$, $0<q\leq1$, respectively.

12. The fluorescent substance according to claim 11, wherein M' in the general formula (3) is Sr.

13. The fluorescent substance according to claim 10, wherein the content of oxygen in the matrix is within the range of 0.3% to 30% by weight.

14. The fluorescent substance according to claim 10, wherein the luminescence center element is at least one of Eu and Mn and exhibits an emission peak falling within the range of 400 to 700 nm as the fluorescent substance is excited by an electron energy.

15. The fluorescent substance according to claim 10, wherein the luminescence center element is at least one of Eu and Mn and exhibits an emission peak falling within the range of 400 to 700 nm as the fluorescent substance is excited by a light having a wavelength of 250 nm to 500 nm in wavelength.

16. The fluorescent substance according to claim 10, wherein the luminescence center element is substituted for at least 0.1 mol % of the metal M'.

17. The fluorescent substance according to claim 10, wherein the luminescence center element is substituted for 100% of the metal M'.

18. A light-emitting device comprising:

an energy source configured to emit electrons; and a layer comprising a fluorescent substance and configured to be impinged by the electrons, at least part of the fluorescent substance being formed of a luminescence center element and a matrix composed of a compound having an AlN polytypoid structure represented by the following general formula (1) or (2):

$$(Al,M)_a(N,X)_b \qquad (1)$$

wherein, M is at least one metal excluding Al; X is at least one non-metal excluding N; and a and b are positive values;

$$M'_{2/v}Al_{3n+p}Si_{10-p}N_{3n+14-p}O_p \qquad (2)$$

wherein, M' is a metal selected from the group consisting of alkaline earth metals and rare earth metals; v is the ionic valency of the metal M', and p and n are values satisfying conditions of $0<p<10$, $1 \leqq n$, respectively, wherein the luminescence center element is at least one of Eu and Mn, and wherein the light-emitting device further comprises at least one of a layer comprising a red fluorescent substance and a layer comprising a green fluorescent substance.

19. A light-emitting device comprising:

a light-emitting element configured to emit a light having a wavelength of 250 nm to 500 nm; and a layer comprising a fluorescent substance formed on the light-emitting element, at least part of the fluorescent substance being formed of a luminescence center element and a matrix composed of a compound having an AlN polytypoid structure represented by the following general formula (1) or (2):

$$(Al,M)_a(N,X)_b \qquad (1)$$

wherein, M is at least one metal excluding Al; X is at least one non-metal excluding N; and a and b are positive values;

$$M'_{2/v}Al_{3n+p}Si_{10-p}N_{3n+14-p}O_p \qquad (2)$$

wherein, M' is a metal selected from the group consisting of alkaline earth metals and rare earth metals; v is the ionic valency of the metal M'; and p and n are values satisfying conditions of $0<p<10$, $1 \leqq n$, respectively, and wherein the luminescence center element is at least one of Eu and Mn, and the light-emitting device further comprises at least one of a layer comprising a red fluorescent substance and a layer comprising a green fluorescent substance.

* * * * *